(12) United States Patent
Bairavasundaram et al.

(10) Patent No.: US 9,317,435 B1
(45) Date of Patent: Apr. 19, 2016

(54) SYSTEM AND METHOD FOR AN EFFICIENT CACHE WARM-UP

(71) Applicant: NetApp Inc., Sunnyvale, CA (US)

(72) Inventors: Lakshmi Narayanan Bairavasundaram, San Jose, CA (US); Gokul Soundararajan, Sunnyvale, CA (US); Mark Walter Storer, Walnut Creek, CA (US); Yiying Zhang, Madison, WI (US)

(73) Assignee: NetApp, Inc., Sunnyvale, CA (US)

( * ) Notice: Subject to any disclaimer, the term of this patent is extended or adjusted under 35 U.S.C. 154(b) by 253 days.

(21) Appl. No.: 13/718,452

(22) Filed: Dec. 18, 2012

(51) Int. Cl.
*G06F 12/00* (2006.01)
*G06F 12/08* (2006.01)

(52) U.S. Cl.
CPC ........ *G06F 12/0848* (2013.01); *G06F 12/0868* (2013.01); *G06F 12/0888* (2013.01); *G06F 12/0804* (2013.01)

(58) Field of Classification Search
CPC ..... G06F 3/0611; G06F 3/0656; G06F 13/14; G06F 13/1668; G06F 13/1673; G06F 12/0877; G06F 12/0888; G06F 12/0862
USPC ........... 711/118, 137, 161, 162; 709/217–219
See application file for complete search history.

(56) References Cited

U.S. PATENT DOCUMENTS

| | | | |
|---|---|---|---|
| 6,266,742 B1* | 7/2001 | Challenger et al. ........... | 711/133 |
| 7,721,048 B1 | 5/2010 | Sendag et al. | |
| 2002/0078300 A1 | 6/2002 | Dharap | |
| 2006/0041720 A1 | 2/2006 | Hu et al. | |
| 2009/0144746 A1* | 6/2009 | Song et al. ..................... | 718/105 |
| 2010/0146495 A1* | 6/2010 | Song et al. ..................... | 717/160 |
| 2010/0228909 A1 | 9/2010 | Cornwell et al. | |
| 2010/0281216 A1* | 11/2010 | Patel et al. .................... | 711/118 |
| 2012/0017048 A1 | 1/2012 | Alben | |
| 2012/0054445 A1* | 3/2012 | Swart et al. ................... | 711/133 |
| 2012/0173824 A1* | 7/2012 | Iyigun et al. .................. | 711/144 |
| 2012/0215949 A1* | 8/2012 | Chiu et al. ..................... | 710/18 |
| 2013/0042066 A1* | 2/2013 | Price ............................. | 711/119 |

OTHER PUBLICATIONS

Int'l Search Report and Written Opinion from Corresponding PCT Application No. PCT/US2013/076257, NetApp, Inc., dated Apr. 15, 2014, 10 pages.
U.S. Appl. No. 13/567,484, filed Aug. 6, 2012, titled "System and Method for Maintaining Cache Coherency".
U.S. Appl. No. 13/718,578, filed on Dec. 18, 2012, titled "System and Method for an Efficient Cache Restart".

* cited by examiner

*Primary Examiner* — Jared Rutz
*Assistant Examiner* — Stephanie Wu
(74) *Attorney, Agent, or Firm* — Cesari and McKenna, LLP

(57) ABSTRACT

Described herein is a system and method for an efficient cache warm-up. The system and method may copy data blocks from a primary storage device to a cache memory device. The system and method may identify a subset of data blocks stored on the primary storage device as candidate data blocks for copying to the cache memory device during a cache warm-up period. A cost effectiveness for copying the candidate data blocks to the cache memory device may be determined. In some embodiments, the cost effectiveness may be calculated based on one or more latency values associated with the primary storage device and the cache memory device. The candidate data blocks may be copied to the cache memory device based on the cost effectiveness.

14 Claims, 18 Drawing Sheets

| Segment | Data Blocks | Latency Cache | Latency Now | Latency Later | Effectiveness Rank |
|---|---|---|---|---|---|
| Segment 1 | ABC | TIME 1A | TIME 1B | TIME 1C | 1 |
| Segment 2 | DEF | TIME 2A | TIME 2B | TIME 2C | 2 |
| Segment 3 | GHI | TIME 3A | TIME 3B | TIME 3C | 3 |

FIG.9

SYSTEM AND METHOD FOR AN EFFICIENT CACHE WARM-UP

FIELD

Embodiments of the present disclosure relate to storage systems, and in particular, to efficient cache warm-up.

BACKGROUND

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives (or flash-based devices) organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of storage objects, such as files and logical units (LUs). A known type of file system is a write-anywhere file system that does not overwrite data on disks. An example of a write-anywhere file system that is configured to operate on a storage system is the Write Anywhere File Layout (WAFL®) file system available from NetApp, Inc. Sunnyvale, Calif.

The storage system may be further configured to allow many servers to access storage objects stored on the storage system. In this model, the server may execute an application, such as a database application, that "connects" to the storage system over a computer network, such as a point-to-point link, shared local area network (LAN), wide area network (WAN), or virtual private network (VPN) implemented over a public network such as the Internet. Each server may request the data services of the storage system by issuing access requests (read/write requests) as file-based and block-based protocol messages (in the form of packets) to the system over the network.

A plurality of storage systems may be interconnected to provide a storage system architecture configured to service many servers. In some embodiments, the storage system architecture provides one or more aggregates, each aggregate comprising a set of one or more storage devices (e.g., disks). Each aggregate may store one or more storage objects, such as one or more volumes. The aggregates may be distributed across a plurality of storage systems interconnected as a cluster. The storage objects (e.g., volumes) may be configured to store content of storage objects, such as files and logical units, served by the cluster in response to multi-protocol data access requests issued by servers.

Each storage system (node) of the cluster may include (i) a storage server (referred to as a "D-blade") adapted to service a particular aggregate or volume and (ii) a multi-protocol engine (referred to as an "N-blade") adapted to redirect the data access requests to any storage server of the cluster. In the illustrative embodiment, the storage server of each storage system is embodied as a disk element (D-blade) and the multi-protocol engine is embodied as a network element (N-blade). The N-blade receives a multi-protocol data access request from a client, converts that access request into a cluster fabric (CF) message and redirects the message to an appropriate D-blade of the cluster.

The storage systems of the cluster may be configured to communicate with one another to act collectively to increase performance or to offset any single storage system failure within the cluster. The cluster provides data service to servers by providing access to a shared storage (comprising a set of storage devices). Typically, servers will connect with a storage system of the cluster for data-access sessions with the storage system. During a data-access session with a storage system, a server may submit access requests (read/write requests) that are received and performed by the storage system.

Each storage system may receive read requests for data stored on a primary storage device (e.g., a large capacity storage device such as a disk). In response, the storage system may transmit data from a primary storage device to a client associated with the read request. However, such read requests may take a significant time to respond to and cause performance limitations of the storage system. For example, retrieving and transmitting requested data from a primary storage device in response to a read request may produce a slow response time. Thus, an effective method and system for providing higher response time for read requests of a storage system is needed.

Current caching techniques may copy data stored on a primary storage device to a cache memory device. For example, data that is accessed by an application (e.g., in response to a read request) may be copied from the primary storage device to the cache memory device such that a future read request to access the data may be served from the cache memory device as opposed to the primary storage device. However, in such a technique, the cache memory device may only store data after a read request and, as such, it may take a plurality of read requests from an application for the cache memory device to be fully utilized by storing data from the primary storage device. Thus, an effective method and system for storing data from a primary storage device to a cache memory device such that the cache memory device is more fully utilized is needed.

SUMMARY

The embodiments described herein provide a system and method for caching data (for producing faster response times). In some embodiments, a cache memory device may be used to store data for future read requests of data so that the requested data may be more quickly served to a requesting client. For example, the cache memory device may store a copy of some data blocks stored on a primary storage device (e.g., a disk). A read request for a portion of the data stored on the primary storage device may be received by a storage system. If the cache memory device currently stores a copy of the data associated with the read request, then in response to the read request, the data may be retrieved and served from the cache memory device instead of being retrieved and served from the primary storage device. An instance where the cache memory device stores a copy of data associated with a read request may be called a cache hit. Since a primary storage device may be slower than the cache memory device and may be located further away from a storage system receiving the read request, serving the data from the cache memory device instead of the primary storage device may result in better overall performance and response time to the read request.

In some embodiments, the primary storage device may store a relatively large number of data blocks and the cache memory device may store a copy of some data blocks stored on the primary storage device. In some embodiments, a data block stored on the cache memory device may be a copy relative to a data block stored on the primary storage device (i.e., the data block stored on the cache memory device may be a copy of a data block on the primary storage device). The data blocks stored on the cache memory device that are copied from the primary storage device are referred to as "corresponding" data blocks for the primary storage devices. As such, a corresponding data block stored on the cache memory device may be retrieved and served in response to a cache hit for data blocks stored on the primary storage device.

In some embodiments, data blocks may be copied from the primary storage device to the cache memory device during a cache warm-up period. For example, a subset of data blocks stored on the primary storage device may be copied from the primary storage device to the cache memory device during a time period when the cache memory device is first available for storing data blocks. As such, instead of copying data blocks from the primary storage device to the cache memory device in response to a read request (e.g., copying data blocks to the cache memory device after receiving a read request for the data blocks), the cache memory device may store corresponding data blocks for the primary storage device quickly such that the cache memory device may operate at full speed (e.g., storing data blocks from the primary storage device for future cache hits) in less time as opposed to waiting for future read requests.

In some embodiments, candidate data blocks stored on the primary storage device that may be copied to the cache memory device during the cache warm-up period may be identified based on one or more data block identification policies. For example, data blocks stored on the primary storage device that are more likely to be accessed in response to a future read request may be identified as candidate data blocks that may be copied to the cache memory device during the cache warm-up period. To identify such candidate data blocks that are more likely to be accessed in response to a future read request, a subset of data blocks stored on the primary storage device may be identified and tracked.

In some embodiments, one or more data block identification policies may be used to identify the candidate data blocks stored on the primary storage device based on a recency of access of the data blocks stored on the primary storage device, when the data blocks stored on the primary storage device were accessed during a time window, and/or how often the data blocks stored on the primary storage device were accessed during a time window. For example, a recent random data block identification policy may identify a random subset of data blocks from a number of data blocks stored on the primary storage device that were accessed (e.g., in response to a read request) during a time window, a recent top data block identification policy may identify the most frequently accessed data blocks during a time window, a recent first data block identification policy may identify the first data blocks that were accessed at the start of a time window, and a recent last identification policy may identify the last data blocks that were accessed at the end of a time window. In some embodiments, one or more of the data block identification policies may be used to identify candidate data blocks for copying to the cache memory device. As such, the data block identification policies may be used to identify candidate data blocks from among the data blocks stored on the primary storage device, where the candidate data blocks are likely to be accessed in the future in response to a read request from a requesting client.

In some embodiments, the cost effectiveness of copying the identified candidate data blocks from the primary storage device to the cache memory device may be determined. For example, the cost effectiveness for each of the candidate data blocks may be calculated based on a plurality of latency factors. In some embodiments, the cost effectiveness for a candidate data block may be calculated based on a cache latency that specifies an estimated latency (e.g., time to access) the candidate data block if the candidate data block were stored on the cache memory device. As such, the cache latency may specify an amount of time for a cache memory device to transmit the candidate data block in response to a cache hit for a corresponding data block on the primary storage device. In some embodiments, the cost effectiveness for the candidate data block may further be calculated based on a current latency that specifies a current latency for the candidate data block that is stored on the primary storage device. As such, the current latency may specify an amount of time for the primary storage device to transmit the candidate data block in response to a read request for the candidate data block. In some embodiments, the cost effectiveness for the candidate data block may further be calculated based on a future latency that specifies a future latency for the candidate data block that is stored on the primary storage device at a future point in time. As such, the future latency may specify an estimated amount of time for the primary storage device to transmit the candidate data block in response to a future read request for the candidate data block.

In some embodiments, the candidate data blocks may be ranked based on the cost effectiveness calculated for each of the candidate data blocks. For example, the candidate data blocks may be ranked by cost effectiveness from the candidate data block with the highest cost effectiveness to the candidate data block with the lowest cost effectiveness. In some embodiments, a threshold effectiveness value may be defined and candidate data blocks with a calculated cost effectiveness above the threshold effectiveness value may be copied from the primary storage device to the cache memory device during the cache warm-up period.

As such, the efficient cache warm-up system and method disclosed herein presents an operating advantage for a storage system environment. For example, caching of data blocks at the start of a cache warm-up period may result in faster response times for read requests as data blocks may already be stored on the cache memory device.

BRIEF DESCRIPTION OF THE DRAWINGS

FIG. 9 shows an exemplary cache effectiveness data structure in which some embodiments operate.

DETAILED DESCRIPTION

Figure 1:
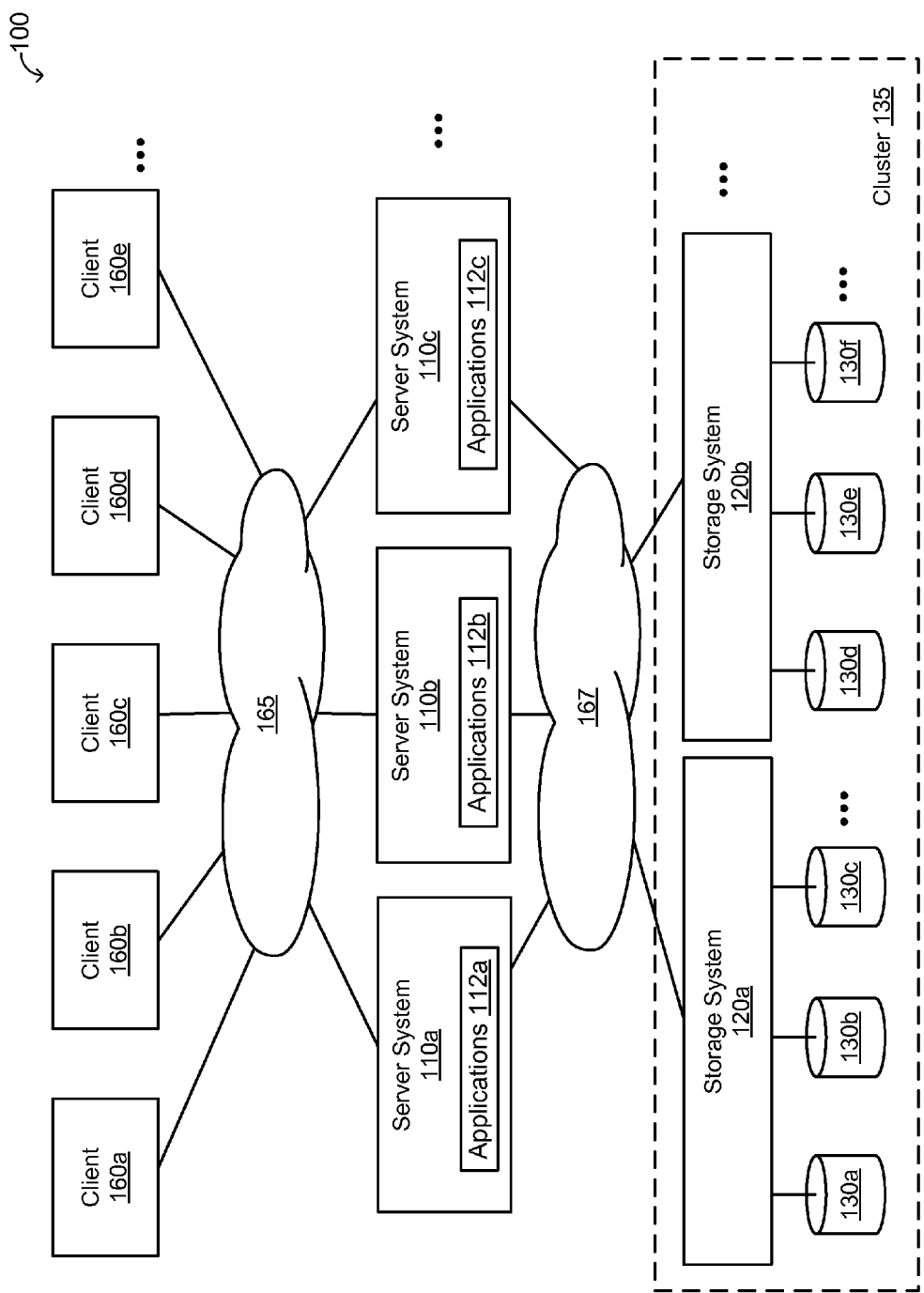
FIG. 1 is a schematic diagram of an exemplary distributed storage system environment in which some embodiments operate.

In the following description, numerous details and alternatives are set forth for purpose of explanation. However, one of ordinary skill in the art will realize that embodiments can be practiced without the use of these specific details. In other instances, well-known structures and devices are shown in block diagram form to not obscure the embodiments with unnecessary detail.

The description that follows is divided into three sections. Section I contains terms used herein. Section II describes a cluster storage system environment in which some embodiments operate. Section III describes a system and method for an efficient cache warm-up. Section IV describes a system and method for an efficient cache restart.

I. Terms

Cluster storage system: As used herein, a cluster storage system may comprise a set of one or more storage systems. In some embodiments, the cluster may comprise one storage system. As such, the terms "cluster" and "storage system" may sometimes be used interchangeably. In other embodiments, a cluster comprises a plurality of storage systems.

Hypervisor: As used herein, a hypervisor may refer to a virtual machine manager that allows multiple operating systems or applications to run concurrently on a host computer. A hypervisor may be referred to as a 'host.' In some embodiments, the hypervisor may present to a guest operating system a virtual operating system and manages the execution of the guest operating system. In some embodiments, multiple instances of a plurality of operating systems may share virtualized hardware (e.g., storage) resources. A hypervisor may be stored on a storage system or server.

Primary Storage Device: As used herein, a primary storage device may refer to a physical storage device that is not a RAM device for computer data storage. In some embodiments, a primary storage device is a non-volatile storage device. In some embodiments, a primary storage device may have a larger storage capacity than a RAM device and a slower access or response time than a RAM device. A primary storage device may comprise a writable storage device media, such as disk device, video tape, optical, DVD, magnetic tape, and any other similar media adapted to store information. In some embodiments, a primary storage device is not used as a cache memory device and may have larger data capacity and longer response times to read requests than the cache memory device.

Cache Memory Device: As used herein, a cache memory device may refer to a physical device for computer data storage. In some embodiments, the cache memory device may be a phase-change memory device, flash memory device, any type of solid-state device, or a disk drive. In some embodiments, the cache memory device may be a random access memory (RAM) or non-volatile RAM (NVRMAM) device. In some embodiments, a RAM device may store data to be directly accessed in any (e.g., random) order. A RAM device may comprise volatile or non-volatile memory. For volatile RAM devices, the stored data is lost if the power to the RAM device is removed. For example, a volatile RAM device may store data, but if the volatile RAM device loses power, then the data may be erased or lost. For non-volatile RAM (NVRAM) devices, the stored data is not lost if the power to the NVRAM device is removed. Examples of RAM devices includes flash memory, Magnetic Random Access Memory (MRAM), Phase Change RAM (PRAM), etc. In some embodiments, a cache memory device may store data so that future read requests may be served faster. For example, the cache memory device may store duplicates or copies of data stored on one or more primary storage devices. If a read request for data is received and if the requested data is stored in the cache memory device (e.g., a cache hit), then the data may be transmitted from the cache memory device instead of being transmitted from the primary storage device. If the requested data is not stored in the cache memory device (e.g., a cache miss), then the data may be transmitted from the primary storage device. In some embodiments, the cache memory device is faster (e.g., a quicker access time for data stored on the cache memory device) than a primary storage device and may be stored closer to a client requesting data (e.g., on a storage system or a server system).

Cache Coherency: As used herein, cache coherency may refer to the consistency of data stored in a cache memory device. For example, the cache memory device may be a shared cache resource for a plurality of primary storage devices. In some embodiments, the shared cache memory device stores copies or duplicates of data from the primary storage devices. If a primary storage device receives a write request (e.g., changes or modifies data stored on the primary storage device), then the data stored on the primary storage device may be changed. In some embodiments, if such a change is not reflected in the cache memory device, then the data stored on the cache memory device may no longer be a duplicate or copy of the particular piece of data stored on the primary storage device. Such an inconsistency (e.g., a piece of data stored on the cache memory device no longer being a duplicate or copy of data stored on the primary storage device) may be referred to as cache incoherency. In contrast, if the data stored on the cache memory device is a duplicate or copy of the data on the primary storage device, then the data is consistent and such a situation may be referred to as cache coherency.

II. Cluster Storage System Environment

FIG. 1 is a block diagram of an exemplary virtual server environment 100 in which some embodiments operate. The environment 100 may comprise a set of one or more server systems 110 (e.g., server systems 110a, 110b, 110c, etc.) connected to one or more client systems 160 (e.g., client systems 160a, 160b, 160c, 160d, 160e, etc.) via a network 165 and one or more storage systems 120. The server systems 110 may each access one or more storage systems 120 (e.g., storage systems 120a, 120b, etc.) that are connected to the server systems 110 via a network 167. The one or more storage systems 120 comprise a cluster storage system 135. Each storage system 120 in the cluster 135 may comprise a set of primary storage devices 130 (e.g., storage devices 130a, 130b, 130c, etc.) for storing client data, the storage devices 130 of the cluster 135 comprising a shared storage of the storage system 120. Note that the server systems 110 are also connected to each other (e.g., via network 167) for communicating with each other (e.g., for working collectively to provide data-access service to the client systems 160 and for collectively hosting a plurality of virtual machines as described herein).

A client system 160 may comprise a computer system that may interact with a server system 110 for submitting read/write access requests and for receiving or transmitting data from or to the server systems 110 over the network 165. In a virtual server environment, a client system 160 may interact over the network 165 with one or more virtual machines (VMs) executing on a server system 110 for submitting read/write access requests and for receiving or transmitting data from or to the storage system 120 over the network 167.

A server system 110 may comprise a computer system that may execute one or more applications 112 (e.g., applications 112a, 112b, etc.) that interacts with the storage systems 120 and client systems 160 for receiving read/write access requests and receiving or transmitting data over the network 167 and the network 165. In some embodiments, a server system 110 may comprise a chassis hosting multiple instances of server systems 110, each server system 110 hosting multiple client systems embodied as virtual machines. The network 167 and/or subnets of networks 167 may be physically embodied within such a chassis.

An application 112 executing on a server system 110 may provide data-access services to client systems 160 by transmitting and processing access requests for data from the storage system(s) 120. In turn, an application 112 utilizes the services of the storage system 120 to access, store, and manage data in a set of storage devices 130. As such, a server system 110 may execute one or more applications 112 that submit access requests for accessing particular storage objects on the storage devices. Each application 112 may submit access requests for accessing particular storage objects on the storage systems of the cluster 135 and the cluster 135 may perform the received requests on the storage objects. An application 112 may comprises a non-virtual machine based application, such as a typical email exchange application or database application. In other embodiments, an application 112 may comprise a virtual machine-based application, such as a virtual machine (discussed below).

A storage system 120 may be coupled locally to a server system 110 over a network 167 such as a local area network (LAN), an Ethernet subnet, a PCI or PCIe subnet, a switched PCIe subnet, a wide area network (WAN), a metropolitan area network (MAN), the Internet, or the like. In some embodiments, a server system 110 may comprise a chassis hosting multiple instances of server systems 110 within a single chassis (e.g., a blade server chassis), with each instance of a server system 110 in communication with each other instance of a server system 110 in the chassis via network 167.

Interaction between the server systems 110 and the storage system(s) 120 can enable the provision of storage services. That is, the server systems 110 may request the services of the storage system(s) 120 (by submitting read/write access requests), and the storage system(s) 120 may respond to read/write access requests of the server systems 110 by receiving or transmitting data to the server systems 110 over the network 167 (e.g., by exchanging data packets through a connection over the network 167).

Communications between a storage system 120 and any of server systems 110 are typically embodied as packets sent over the computer network 167. A server system 110 may send an access request (a read/write access request) to the storage system 120 for accessing particular data stored on the storage system. The server system 110 may request the services of the storage system 120 by issuing storage-access protocol messages formatted in accordance with a conventional storage-access protocol for accessing storage devices (such as CIFS, NFS, etc.). Access requests (e.g., read/write access requests) may be implemented by issuing packets using file-based access protocols—such as the Common Internet File System (CIFS) protocol or Network File System (NFS) protocol—over the Transmission Control Protocol/Internet Protocol (TCP/IP) when accessing data in the form of files and directories. Alternatively, the server system 110 may issue access requests by issuing packets using block-based access protocols—such as the Fibre Channel Protocol (FCP), Fibre Channel over Ethernet (FCoE), or Internet Small Computer System Interface (iSCSI) Storage Area Network (SAN) access—when accessing data in the form of blocks.

Each application 112 executing on a server system 110 may utilize services of the cluster 135 to store and access its data. The storage system 120 may comprise a computer system that stores data in a set of one or more storage devices 130 as storage objects. A storage device 130 may comprise writable storage device media such as storage devices, video tape, optical devices, DVD, magnetic tape, flash memory, Magnetic Random Access Memory (MRAM), Phase Change RAM (PRAM), or any other similar media adapted to store information (including data and parity information).

As known in the art, a storage device 130 may comprise storage objects comprising one or more storage volumes, where each volume has a file system implemented on the volume. A file system implemented on the storage devices 130 may provide multiple directories in a single volume, each directory containing zero or more filenames. A file system provides a logical representation of how data (files) are organized on a volume where data (files) are represented as filenames that are organized into one or more directories. Examples of common file systems include New Technology File System (NTFS), File Allocation Table (FAT), Hierarchical File System (HFS), Universal Storage Device Format (UDF), UNIX® file system, and the like. For the Data ONTAP® storage operating system (available from NetApp, Inc. of Sunnyvale, Calif.) which may implement a Write Anywhere File Layout (WAFL®) file system, there is typically a WAFL file system within each volume, and within a WAFL file system, there may be one or more logical units (LUs).

Figure 2:
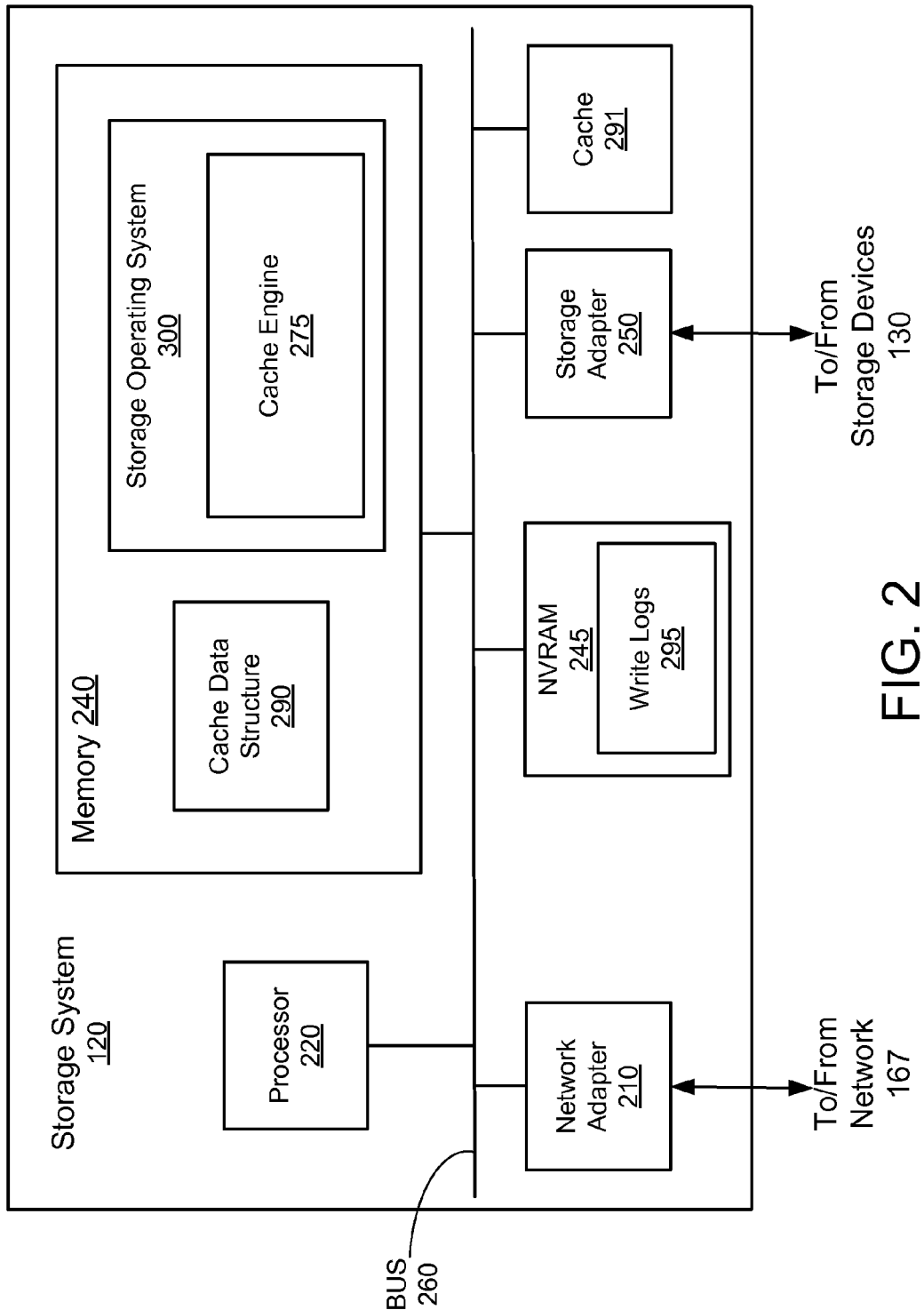
FIG. 2 is a schematic block diagram of an exemplary storage system that may be employed in the storage system environment of FIG. 1.

FIG. 2 is a schematic block diagram of an exemplary storage system 120 that may be employed in the storage system environment of FIG. 1. Those skilled in the art will understand that the embodiments described herein may apply to any type of special-purpose computer (e.g., storage system) or general-purpose computer, including a standalone computer, embodied or not embodied as a storage system. To that end, storage system 120 can be broadly, and alternatively, referred to as a computer system. Moreover, the teachings of the embodiments described herein can be adapted to a variety of storage system architectures including, but not limited to, a network-attached storage environment, a storage area network and disk assembly directly-attached to a server computer. The term "storage system" should, therefore, be taken broadly to include such arrangements.

The storage system 120 comprises a network adapter 210, a processor 220, a memory 240, a non-volatile random access memory (NVRAM) 245, and a storage adapter 250 interconnected by a system bus 260. The network adapter 210 comprises the mechanical, electrical and signaling circuitry needed to connect the storage system 120 to a server system 110 over a computer network 150. The storage system may include one or more network adapters. Each network adapter 210 has a unique IP address and may provide one or more data access ports for server systems 110 to access the storage system 120 (where the network adapter accepts read/write access requests from the server systems 110 in the form of data packets). In some embodiments, the storage adapter 250 and the network adapter 210 may comprise a single unified target adapter (UTA) that may be used to perform the functionality of both the storage adapter 250 and the network adapter 210.

The memory 240 comprises storage locations that are addressable by the processor 220 and adapters for storing software program code and data. The memory 240 may comprise a form of random access memory (RAM) that is generally cleared by a power cycle or other reboot operation (e.g., it is a "volatile" memory). In other embodiments, however, the memory 240 may comprise a non-volatile form of memory that does not require power to maintain information. The processor 220 and adapters may, in turn, comprise processing elements and/or logic circuitry configured to execute the software code and manipulate the data stored in the memory 240.

The storage system 120 may also include a NVRAM 245 that may be employed as a backup memory that ensures that the storage system 120 does not "lose" received information, e.g., CIFS and NFS requests, in the event of a system shutdown or other unforeseen problem. The NVRAM 245 is typically a large-volume solid-state memory array having either a back-up battery, or other built-in last-state-retention capabilities (e.g. a FLASH memory), which holds the last state of the memory in the event of any power loss to the array. Therefore, even if an access request stored in memory 240 is lost or erased (e.g., due to a temporary power outage) it still may be recovered from the NVRAM 245. The write logs or write requests 295 may be stored, for example, to the NVRAM 245 (as shown in FIG. 2).

The processor 220 executes a storage operating system application 300 of the storage system 120 that functionally organizes the storage system by, inter alia, invoking storage operations in support of a file service implemented by the storage system. In some embodiments, the storage operating system 300 comprises a plurality of software layers (including a cache coherency engine) that are executed by the processor 220. Portions of the storage operating system 300 are typically resident in memory 240. It will be apparent to those skilled in the art, however, that other processing and memory means, including various computer readable media, may be used for storing and executing program instructions pertaining to the storage operating system 300.

In some embodiments, a cache data structure 290 is also resident in memory 240. In other embodiments, the cache data structure 290 may also be resident in NVRAM 245 or stored on a cache memory device 291. As discussed below, in some embodiments, the cache data structure 290 is produced and used by the cache engine 275 to store metadata for efficient cache warm-up. Furthermore, in some embodiments, a cache tree data structure may be resident in memory 240.

The storage adapter 250 cooperates with the storage operating system 300 executing on the storage system 120 to access data requested by the server system 110. The data may be stored on the storage devices 130 that are attached, via the storage adapter 250, to the storage system 120 or other node of a storage system as defined herein. The storage adapter 250 includes input/output (I/O) interface circuitry that couples to the storage devices 130 over an I/O interconnect arrangement, such as a conventional high-performance, Fibre Channel serial link topology. In response to an access request received from a server system 110, data may be retrieved by the storage adapter 250 and, if necessary, processed by the processor 220 (or the adapter 250 itself) prior to being forwarded over the system bus 260 to the network adapter 210, where the data may be formatted into a packet and returned to the server system 110.

In an illustrative embodiment, the storage devices 130 may comprise disk devices that are arranged into a plurality of volumes, each having a file system associated therewith. In some embodiments, the storage devices 130 comprise disk devices that are configured into a plurality of RAID (redundant array of independent disks) groups whereby multiple storage devices 130 are combined into a single logical unit (i.e., RAID group). In a typical RAID group, storage devices 130 of the group share or replicate data among the disks that may increase data reliability or performance. The storage devices 130 of a RAID group are configured so that some disks store striped data and at least one disk stores separate parity for the data, in accordance with a preferred RAID-4 configuration. However, other configurations (e.g. RAID-5 having distributed parity across stripes, RAID-DP, etc.) are also contemplated. A single volume typically comprises a plurality of storage devices 130 and may be embodied as a plurality of RAID groups.

The organization of a storage operating system 300 for the exemplary storage system 120 is now described briefly. However, it is expressly contemplated that the principles of the embodiments described herein can be implemented using a variety of alternative storage operating system architectures. As discussed above, the term "storage operating system" as used herein with respect to a storage system generally refers to the computer-executable code operable on a storage system that implements file system semantics (such as the above-referenced WAFL®) and manages data access. In this sense, Data ONTAP® software is an example of such a storage operating system implemented as a microkernel. The storage operating system can also be implemented as an application program operating over a general-purpose operating system, such as UNIX® or Windows®, or as a general-purpose operating system with configurable functionality.

Figure 3:
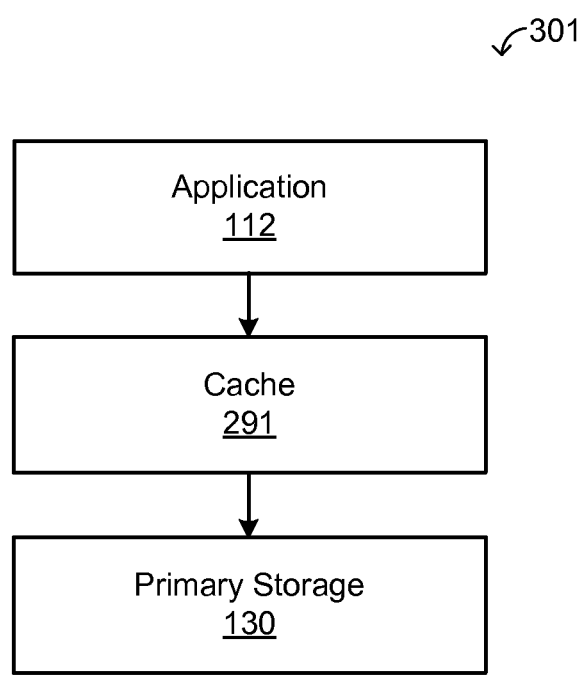
FIG. 3 is a schematic block diagram of an environment for using a cache in which some embodiments operate.

FIG. 3 is a schematic block diagram of an environment 301 for using a cache. In general, the environment 301 may comprise an application 112, cache 291 (e.g., a cache memory device), and primary storage device 130. In some embodiments, the application 112 may run on a server system (e.g., server system 110a, 110b, and/or 110c) and request data stored on a primary storage device 130. In response to a request for data stored on the primary storage device 130, a storage system (e.g., storage system 120a and/or 120b) may transmit data stored on the primary storage device 130 to a server system hosting the application 112. In some embodiments, such data may be stored within the cache 291. For example, the cache 291 may be used to store data from the storage device 130 that has been recently requested by the application 112 and transmitted from the storage device 130 to a server system hosting the application. As such, the cache 291 may store a duplicate of at least part of the data stored on the primary storage device 139. In some embodiments, the cache 291 may be located on the server system, storage system, or as a separate component within the environment 301.

In some embodiments, data may be stored on the cache 291 as soon as the cache 291 is online (e.g., available for storing data). For example, data may be stored on the cache 291 as soon as the cache 291 is available instead of being stored on the cache 291 only as data is requested by the application 112. Storing such data on the cache 291 as soon as the cache 291 is online may be referred to as a bulk cache warm-up and is discussed in further detail with regard to Section III.

In some embodiments, the cache 291 may be a host-side cache. For example, a server system (e.g., server system 110a, 110b, and/or 110c) running an application may comprise the cache 291. In another embodiment, the cache 291 may be a storage cluster cache memory. For example, a storage system (e.g., storage system 120a and/or 120b) may comprise the cache 291. In some embodiments, the cache 291 may be a cloud gateway cache. For example, a separate storage device (e.g., a device on the network 167) may be used to store a subset of the data from the storage devices. In some embodiments, the use of the cache 291 may involve application 112 transmitting a request (e.g., read request) to the cache 291. In response, the cache 291 may determine if the data associated with the read request is currently stored on the cache 291. If the requested data is stored on the cache 291, then the cache 291 may respond by transmitting the requested data that is stored on the cache 291. In some embodiments, a read request from an application for data on a primary storage device 130 when the cache 291 stores a copy of the data from the primary storage device 130 may be referred to as a cache hit. In the same or alternative embodiments, if the read request from the application is for data on a primary storage device 130 where the cache 291 does not have a stored copy of the data from the primary storage device 130 (e.g., the cache 291 does not store a duplicate or copy of the data associated with the read request), then such a circumstance may be referred to as a cache miss. In some embodiments, in response to a cache miss, the cache 291 may transmit the read request from the application to the primary storage device 130 or a storage system (e.g., storage system 120a and/or 120b) associated with the primary storage device 130. In some embodiments, the application 112 may transmit a write request comprising data to be stored on a primary storage device 130. In response to the write request from the application 112, the cache 291 may transmit the write request to the primary storage device 130. In some embodiments, the primary storage device 130 may store the data associated with the write request and the cache 291 may update its data content in response to the primary storage device 130 storing the data. For example, the cache 291 may store a copy of the data associated with the write request. In some embodiments, the primary storage device 130 may transmit a confirmation or reply associated with the storage of the data associated with the write request to the cache 291 and the cache 291 may further transmit such information to the application 112.

As such, the cache 291 may be used to store a subset of data stored on the primary storage device 130. In some embodiments, the subset of data may be selected and stored on the cache 291 based on various factors as disclosed in further detail below with regard to Section III. The data may be stored on the cache 291 as soon as the cache 291 is made available.

Figure 4:
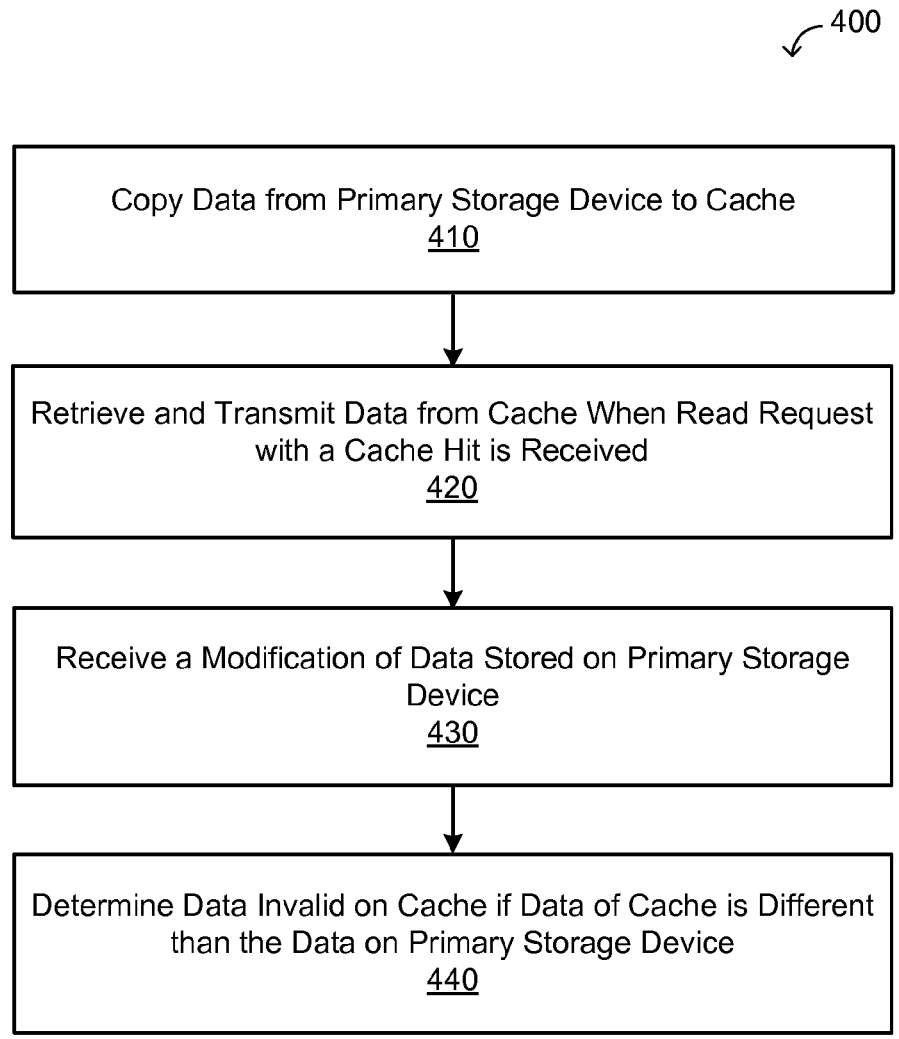
FIG. 4 is a flowchart of a technique to use a cache associated with a primary storage device in accordance with some embodiments.

FIG. 4 is a flowchart of a technique 400 to use a cache associated with a primary storage device in accordance with some embodiments. In general, the technique 400 maintains coherency between data stored by a cache (e.g., cache 291) and data stored by at least one storage device (e.g., primary storage device 130). For example, the technique 400 may ensure that the data stored on the cache 291 is a duplicate or copy of the corresponding data stored in the primary storage device 130. In some embodiments, the storage system 120 and/or the cache engine 275 of the storage system 120 may perform the technique 400. The technique 400 is described in relation to FIGS. 2 and 3, which conceptually illustrates the steps of the technique 400. In some embodiments, the technique 400 may maintain coherency of data stored on a cache and data stored on a primary storage device without human initiation, interaction, or intervention. In some embodiments, particular steps of the technique 400 may be performed automatically, without human initiation, interaction, or intervention, while other steps of the technique 400 may be performed with human interaction.

In some embodiments, some of the steps of technique 400 are performed or caused to be performed by a cache engine 275 on a storage operating system 300 of a storage system 120. The cache engine 275 may be configured to operate in conjunction with other software modules of the storage system 120, server system 110, and software modules of the storage operating system 300 to collectively perform the embodiments described herein.

The technique 400 begins by copying (at step 410) data from at least one primary storage device (e.g., primary storage device 130) to a cache memory device (e.g., cache 291). In some embodiments, a subset of data (e.g., one or more data blocks from the primary storage device) may be copied to the cache. In some embodiments, the copying of the subset of data to the cache may begin when the cache is available. Further details with regard to the storing of the subset of data when the cache is available are disclosed with relation to Section III.

The technique 400 may further retrieve and/or transmit (at step 420) data from the cache when a read request associated with data stored on the primary storage device is received (e.g., a cache hit). For example, as described with relation to step 410, the cache may store a duplicate or copy of data (e.g., data blocks) from the primary storage device. If the storage system comprising the cache receives a read request for data that is stored on the primary storage device, the copied or duplicated data on the cache may be transmitted in response to the read request. In some embodiments, such an instance where a read request is for data of a primary storage device where the cache is storing a duplicate copy of the requested data may be termed as a cache hit. In response to an identification of a cache hit, the storage system may transmit or fetch the data from the cache instead of transmitting or fetching the data from a primary storage device. The technique 400 may further receive or identify (at step 430) a modification of data stored on a primary storage device. For example, the storage system 120 may receive a write request of data or a backup restore notification to at least one of the primary storage devices 130. In some embodiments, the write request may overwrite data stored on the primary storage device in response to new data associated with the write request. As such, over time, the data currently stored on the cache (e.g., data previously copied to the cache memory from a primary storage device) may no longer be duplicates or copies of data stored on one or more of the primary storage devices. In some embodiments, data stored on the cache memory that is no longer a duplicate of data stored on one or more primary storage devices is considered to be incoherent relative to the primary storage device with the modified data. In some embodiments, the modification of data on the primary storage devices may be the result of a backup restore of a primary storage device.

The technique 400 may further invalidate (at step 440) data stored on the cache. For example, data stored on the cache that is incoherent relative to data stored on a primary storage device may be invalidated. For example, data that has been modified (e.g., as disclosed at step 430) may be invalidated. Further details with regard to invalidating data on the cache are disclosed with relation to Section IV. In some embodiments, once the invalidated data has been identified, the systems and methods as disclosed with regard to Section III may be used to store data on the invalidated portions of the cache.

III. Systems and Methods for an Efficient Cache Warm-Up

Figure 5:
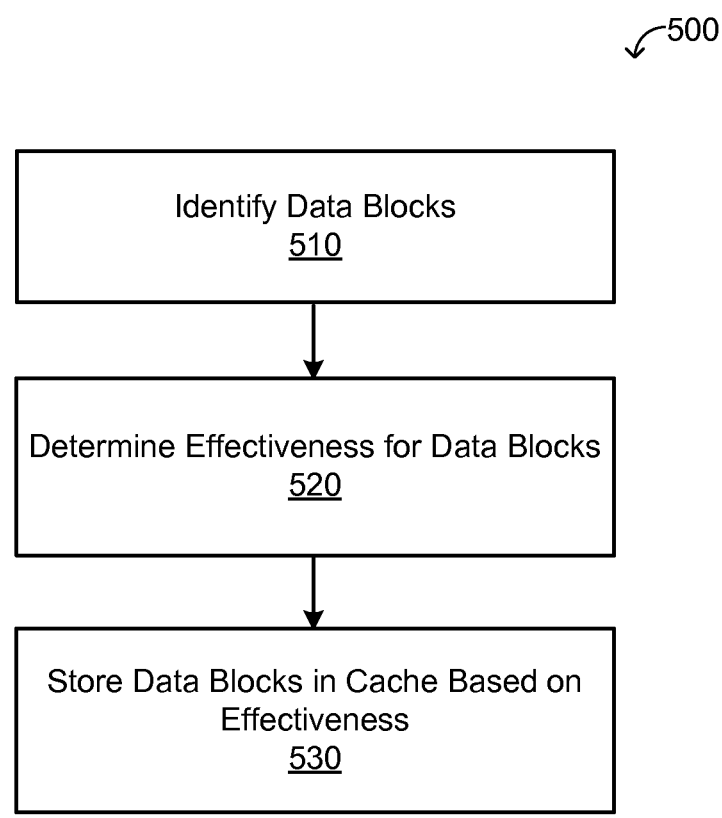
FIG. 5 is a flowchart of a technique to store data blocks stored on a cache in which some embodiments operate.

FIG. 5 is a flowchart of a technique 500 to store data blocks in a cache in which some embodiments operate. In general, the technique 500 may be used to copy and store effective data (e.g., data blocks) from a primary storage device (e.g., primary storage device 130) on a cache memory (e.g., cache 291). In some embodiments, the storage system 120 and/or the cache engine 275 of the storage system 120 may perform the technique 500. The technique 500 is described in relation to FIGS. 1-3, which conceptually illustrates the steps of the technique 500. In some embodiments, the technique 500 may copy and store effective data blocks from a primary storage device to a cache with human initiation, interaction, or intervention. In some embodiments, particular steps of the technique 500 may be performed automatically, without human initiation, interaction, or intervention, while other steps of the technique 500 may be performed with human interaction. For example, in some embodiments, the steps of the technique 500 may be initiated when the cache is online and available for storing data blocks.

In some embodiments, some of the steps of technique 500 are performed or caused to be performed by a cache engine 275 on a storage operating system 300 of a storage system 120. The cache engine 275 may be configured to operate in conjunction with other software modules of the storage system 120, server system 110, and software modules of the storage operating system 300 to collectively perform the embodiments described herein.

As shown in FIG. 5, the technique 500 may identify (at step 510) one or more data blocks. For example, the cache engine 275 may identify a plurality of data blocks currently stored on a primary storage device (e.g., primary storage device 130). In some embodiments, the data blocks may be identified based on a likelihood that the data blocks may be read at least once in the future. For example, data blocks may be identified based on a likelihood of receiving a future read request from an application (e.g., application 112). As such, a set of data blocks (e.g., a subset of the data blocks stored on a primary storage device) may be identified. In some embodiments, the data blocks may be identified based on a location of the data blocks on the primary storage device. For example, the cache engine 275 may identify data blocks at a location of a primary storage device that receives a higher amount of read requests from an application 112. Further details with regard to identifying data blocks are discussed with regard to FIG. 6 below.

In some embodiments, the technique 500 may determine (at step 520) the effectiveness of storing data blocks on a cache. For example, the cache engine 275 may determine the effectiveness of storing data blocks that have been identified at step 510 on a cache (e.g., cache 291). Further details with regard to determining the effectiveness of storing the data blocks in a cache memory device are disclosed with regard to FIG. 7 below. Furthermore, the technique 500 may store (at step 530) data blocks in the cache. For example, the cache engine 275 may store one or more of the identified data blocks based on the determined effectiveness of associated with the data blocks on the cache.

Figure 6:
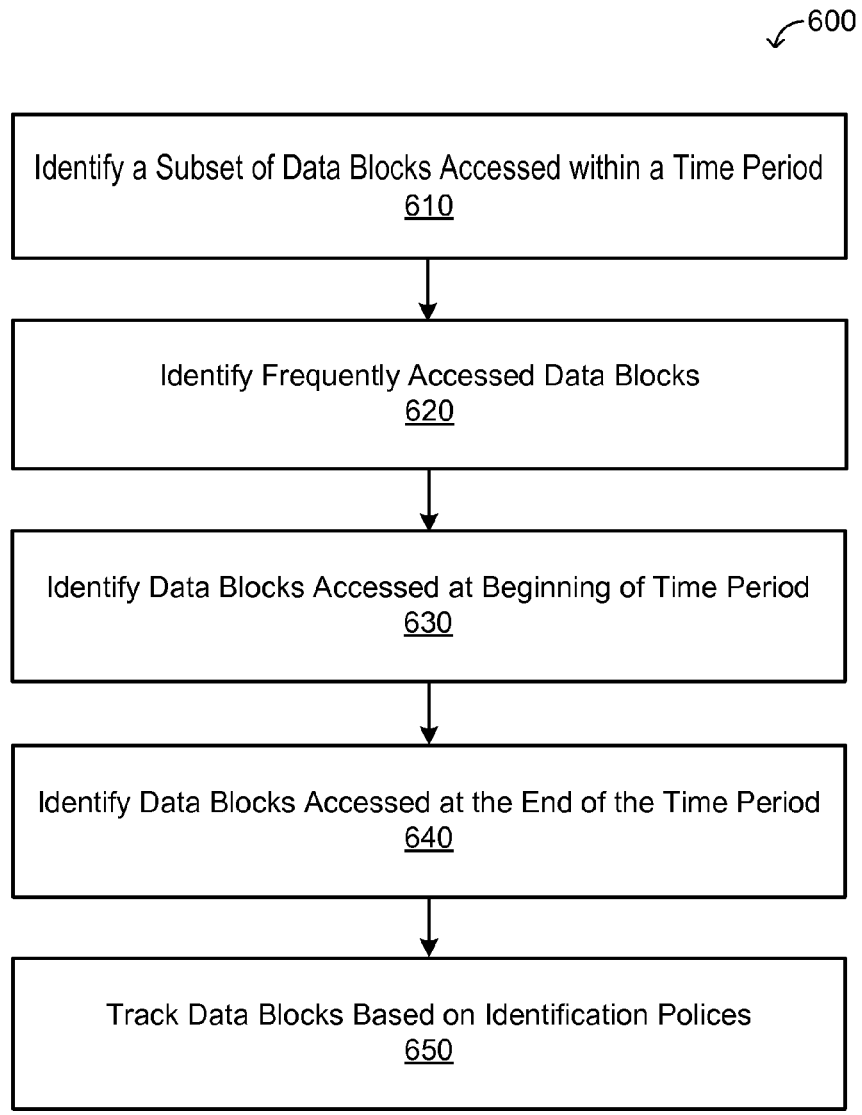
FIG. 6 is a flowchart of a technique to track data blocks stored on a primary storage device in which some embodiments operate.

FIG. 6 is a flowchart of a technique 600 to track data blocks stored on a primary storage device in which some embodiments operate. In general, the technique 600 may be used to track one or more identified data blocks stored on a primary storage device (e.g., primary storage device 130) as part of determining data blocks to copy and store onto a cache memory device (e.g., cache 291) when the cache is available for storing data blocks. In some embodiments, the storage system 120 and/or the cache engine 275 of the storage system 120 may perform the technique 600. In the same or alternative embodiments, particular steps of the technique 600 may be performed automatically, without human initiation, interaction, or intervention, while other steps of the technique 600 may be performed with human interaction.

As shown in FIG. 6, the technique 600 may identify (at step 610) a subset of data blocks that have been accessed within a time period. For example, the cache engine 275 may use an identification policy to identify a subset of data blocks stored on a primary storage device (e.g., primary storage device 130) that have been accessed in response to a read request from an application (e.g., application 112) within a predetermined time period. In some embodiments, the identification policy used by the cache engine 275 may be configured to pick a random subset of data blocks stored on the primary storage device from a plurality of data blocks that have been accessed by an application (e.g., from a read request) within a recent or predetermined time period. As such, a subset of the accessed data blocks may be identified. In some embodiments, the cache engine 275 may create a hash value for the data block numbers by using a randomizing hash algorithm (e.g., MD5, SHA, Jenkins hash, etc.) and if the hash value falls within a specified range value, then the data block number may be recorded by the cache engine 275. As such, the cache engine 275 may use an identification policy to identify a subset of data blocks stored on the primary storage device that have been accessed by an application within a recent time period. Furthermore, the technique 600 may identify (at step 620) frequently accessed data blocks. For example, the cache engine 275 may be configured to identify data blocks based on a 'recent top' policy. In some embodiments, a 'recent top' policy may identify the most frequently accessed data blocks in a predetermined time period. For example, the 'recent top' policy may select the top or most frequently accessed data blocks associated with read requests from an application 112. In some embodiments, data blocks that have been accessed a number of times above a threshold value may be identified. For example, data blocks stored on a primary storage device (e.g., primary storage device 130) that have been accessed (e.g., retrieved as part of a read request) by an application (e.g., application 112) by an amount that is the same and/or more than a threshold numerical value may be identified as potential data blocks for storing on a cache memory (e.g., cache memory device 320). As such, in some embodiments, a subset of data blocks stored on a primary storage device may be identified based on a number of times that the data blocks have been accessed (e.g., from a read request) on a primary storage device.

In some embodiments, the technique 600 may further identify (at step 630) data blocks that have been accessed at the beginning of a time period. For example, the cache engine 275 may use a 'recent first' identification policy to identify data blocks on a primary storage device (e.g., primary storage device 130) that were accessed at the start or beginning of a specified or predetermined time period. In some embodiments, the 'recent first' identification policy may comprise identifying or selecting a number of data blocks on a primary storage device that are first accessed by a read request associated with an application. For example, the specified time period may comprise a static window of a specified amount of time. A specified number of data blocks that are first accessed within the static window may be identified. As such, a number of data blocks that are accessed at the start of a time window may be identified. The technique 600 may further identify (at 640) data blocks that have been accessed at the end of a time period or static window. For example, the cache engine 275 may use a 'recent last' identification policy to identify data blocks stored on a primary storage device (e.g., primary storage device 130) that were accessed at the end of a static window. In some embodiments, the 'recent last' identification policy may comprise identifying or selecting a number of data blocks stored on a primary storage device that were last accessed by a read request associated with an application. For example, the specified time period may comprise a static window of a specified amount of time and the number of data blocks that are accessed at the end of the time window may be identified. As such, a number of data blocks that were accessed at the end of a time window may be identified. Finally, the technique 600 may track (at step 650) data blocks based on the data block identification policies as described above. For example, the cache engine 275 may use any or all of the policies as disclosed with regard to steps 610, 620, 530, and 640. As such, a single identification policy or a combination of the above disclosed identification policies may be used to identify data blocks.

In some embodiments, the above-disclosed policies may be used by the cache engine 275 to track data blocks or groups of data blocks. As such, a granularity of a plurality data blocks, instead of only a single data block, may be used to identify and track individual groups of data blocks. For example, a data block may be a size of 4 kilobytes and a group of data blocks of a size of 16 megabytes may be identified and tracked with the above-disclosed identification policies. In some embodiments, a group of data blocks may comprise a sequential group of data blocks stored on a primary storage device. In the same or alternative embodiments, the sequential group of data blocks may comprise data blocks with adjacent locations on a primary storage device. In some embodiments, a percentage or fraction of the data blocks of a group of data blocks that have been accessed may also be determined and used to determine whether to track the group of data blocks.

As such, the cache engine 275 may use one or more data block identification policies to identify data blocks or groups of data blocks stored on a primary storage device. In some embodiments, the policies may be used to identify data blocks or groups of data blocks based on a recency of access associated with the data blocks or groups of data blocks. In the same or alternative embodiments, the data blocks or groups of data blocks may be identified based on when and/or how often the data blocks or a data block or a minimum number of data blocks in the group of data blocks have been accessed (e.g., from a read request associated with an application) within a specified time period.

Figure 7:
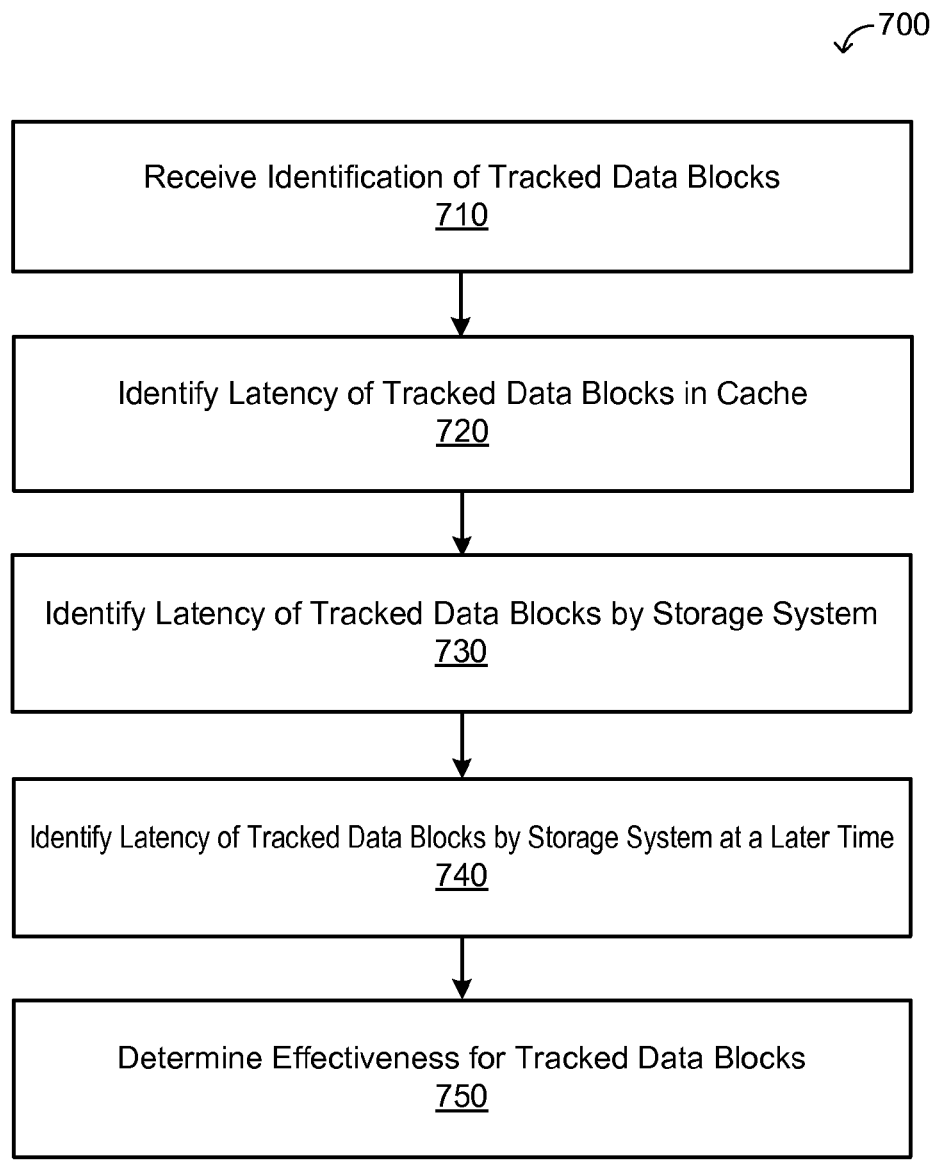
FIG. 7 is a flowchart of a technique to determine the effectiveness of tracked data blocks in accordance with some embodiments.

FIG. 7 is a flowchart of a technique 700 to determine the effectiveness associated with tracked data blocks in accordance with some embodiments. In general, the technique 700 may be used to determine the effectiveness of tracked data blocks (e.g., data blocks that are tracked at step 650 of FIG. 6) stored on a primary storage device (e.g. primary storage device 130) based on one or more latency factors. In some embodiments, the storage system 120 and/or the cache engine 275 of the storage system 120 may perform the technique 700. In the same or alternative embodiments, particular steps of the technique 700 may be performed automatically, without human initiation, interaction, or intervention, while other steps of the technique 700 may be performed with human interaction.

As shown in FIG. 7, the technique 700 may receive (at step 710), an identification of tracked data blocks (e.g., data blocks tracked at step 650 of FIG. 6). In some embodiments, a cache engine 275 may receive the identification information that may comprise the identity of tracked groups of data blocks. In some embodiments, the tracked data blocks or groups of data blocks may comprise a subset of data blocks or groups of data blocks stored on a primary storage device. As such, in some embodiments, the identification of tracked data blocks may comprise a list or data structure indicating data blocks that have been identified to be tracked based on one or more data block identification policies as disclosed with regard to FIG. 6. Furthermore, the technique 700 may identify (at step 720) the latency of the tracked data blocks for storing the tracked data blocks on a cache (e.g., cache 291). For example, the cache engine 275 may identify or determine the latency of the tracked data blocks if the tracked data blocks are copied and stored onto a cache memory (e.g., cache 291) from a primary storage device (e.g., primary storage device 130). As such, the technique 700 may calculate or determine an estimated latency associated with accessing the tracked data blocks or groups of data blocks in a cache. In some embodiments, the latency may be an amount of time that elapses between an application (e.g., application 112) to issue a read request and for the cache memory to receive the read request and to transmit data blocks or groups of data blocks stored on the cache memory if there is a cache hit associated with the read request. As such, the technique 700 may calculate an estimated latency for tracked data blocks or tracked groups of data blocks if the tracked data blocks or tracked groups of data blocks are stored on the cache memory and a cache hit associated with a read request is received. Thus, a latency to access the tracked data blocks or tracked groups of data blocks on the cache memory may be determined.

In some embodiments, the technique 700 may identify (at step 730) the latency of tracked data blocks or tracked groups of data blocks for a primary storage device (e.g., a current primary storage device latency). For example, the cache engine 275 may determine latency for accessing tracked data blocks or tracked groups of data blocks stored on a primary storage device (e.g., primary storage device 130). As such, the technique 700 may be used to determine an amount of time that elapses between a read request from an application and the accessing of tracked data blocks or tracked groups of data blocks on a primary storage device. In some embodiments, the latency for the tracked data blocks or tracked groups of data blocks may be based on access times associated with the primary storage device (e.g., storage disk access times), network speeds (e.g., any additional time from transmitting tracked data blocks or tracked groups of data blocks from a primary storage device 130 to a server system 110 over a network 167), and other factors as relevant with regard to the environment 100. In some embodiments, the current primary storage device latency may indicate a latency currently associated with accessing the data blocks stored on the primary storage device. Next, the technique 700 may further identify or determine (at step 740) the latency of tracked data blocks or tracked groups of data blocks for a primary storage device at a later time (e.g., a later primary storage device latency). For example, the latency as determined at step 730 may be a current latency associated with the tracked data blocks or tracked groups of data blocks and the latency as determined at step 740 may be a future estimated latency associated with the tracked data blocks or tracked groups of data blocks stored on a primary storage device at a later time. In some embodiments, the cache engine 275 may determine the later primary storage device latency. In the same or alternative embodiments, the determined later primary storage device latency may be an estimated or likely latency for accessing data blocks at a later point in time when an application (e.g., application 112) accesses the tracked data blocks or tracked groups of data blocks stored on a primary storage device in association with a read request. For example, the later primary storage device latency may be based on factors such as expected network bandwidth at the later time, whether the tracked data blocks or tracked groups of data blocks are on a primary storage device and the type of access to the tracked data blocks or tracked groups of data blocks (e.g., whether a primary storage device storing the tracked data blocks or tracked groups of data blocks has sequential block access or random block access), and the storage medium of the primary storage device (e.g., whether the primary storage device is a faster medium associated with a faster access time such as RAM, flash, or solid state drives or whether the primary storage device is a slower medium associated with a slower access time such as a storage disk). As such, the determined or calculated later primary storage device latency may be based on network bandwidth, storage device data block access type, and/or a medium of the storage device. In some embodiments, the technique 700 may determine or rank (at step 750) the tracked data blocks or tracked groups of data blocks based on an effectiveness of the tracked data blocks or tracked groups of data blocks. For example, the cache engine 275 may rank the tracked data blocks or tracked groups of data blocks based on the latencies as discussed above with regard to steps 720, 730, and 740. In some embodiments, the effectiveness of a tracked data block or tracked group of data blocks may be determined by the following equation:

$$\text{Effectiveness} = (\text{Latency}_{Later} - \text{Latency}_{cache}) / \text{Latency}_{Now}$$

In some embodiments, Latency$_{Later}$ (also referred to as a future latency) may be the calculated later primary storage device latency as discussed with regard to step 740, the Latency$_{Now}$ may be the calculated current primary storage device latency as discussed with regard to step 730, and the Latency$_{cache}$ may be the calculated cache latency associated with a cache as discussed with regard to step 720. As such, the effectiveness of a tracked data block or tracked group of data blocks may be determined or calculated by a difference of the later latency (i.e., a future latency) subtracted by the cache latency with the difference divided by the current latency of the primary storage device. Thus, if the effectiveness is calculated to be a value of '0', then the effectiveness is low and the associated data blocks may not be copied to the cache memory device, if the effectiveness is calculated to be a value of '1', then the benefit to copying the data blocks to the cache memory device is significant, and a calculated effectiveness value between '0' and '1' may result in a data block being copied to the cache memory device based on a threshold value as further discussed. In some embodiments, the effectiveness may be considered a cost effectiveness of storing the tracked data block or tracked group of data blocks onto a cache memory. In some embodiments, the tracked data blocks or tracked group of data blocks may be ranked based on the effectiveness (e.g., higher effectiveness is better and ranked higher) and the cache engine 275 may use a threshold effectiveness value to store tracked data blocks or tracked groups of data blocks with an effectiveness value equal to and/or higher than the determined or calculated effectiveness for the tracked data blocks or groups of data blocks. As such, tracked data blocks or tracked groups of data blocks with effectiveness higher or equal to the threshold effectiveness value may be copied from a primary storage device to a cache.

In some embodiments, the latency may be determined based on a type of storage medium used. For example, if the storage medium is DRAM-based, the read latency may be known (e.g., from historical records) to be approximately 50 nanoseconds, but if the storage medium is flash-based, the read latency may be known to be between 20 and 100 microseconds, and if the storage medium is disk-based, then the read latency may be between 3 and 15 milliseconds. These latencies may also be verified and enhanced by empirical runtime data since software layers of the storage environment may add significant overheads. In some embodiments, the cache latency may be determined to be the average (or other statistical summary) of read latency to any data block stored on the cache memory for a period of time. The current primary storage device latency may be the current latency to access the specific data block for which a decision to store on the cache memory is being made. In some embodiments, the later latency or future latency may be the expected latency for the specific data block at a later time. Since the estimate is for a later time, the location and/or storage medium in which the block is likely to be stored at that time may be determined. For example, a scheduled maintenance for the data block (e.g., whether the data block is scheduled by the system to be moved or copied to a specific type of storage medium) may be used to determine the later latency. For example, if the data block is currently stored in a flash-based primary storage, there may be at least two possibilities for the primary storage device medium of the data block in the future. If the data block is likely to be stored for a long period of time, the system would use the latency to a flash-based primary storage device as the later latency. If the data block is likely to be evicted or transferred (e.g., copied) to a disk-based primary storage (e.g., the data block is one of the least-recently used data blocks), the historical latencies to a disk-based primary storage (either in general or specific to this data block) may be used for estimating the later latency.

As such, in some embodiments, the later latency may correspond to historical latencies for accessing the data block from the storage medium it is likely to be stored at in the future. In some embodiments, the later latency may be calculated based on the following formula: Latency_Later= (Probability_Flash)*(Latency_Flash)+(Probability_Disk)* (Latency_Disk)+ . . . (e.g., additional types of storage medium such as cloud storage). The probabilities may be determined by location of the data block in the Least Recently Used (LRU) list of data blocks and/or Most Recently Used (MRU) list. For example, the probability of the data block being stored on a disk-based storage medium increases the less accessed or used the data block is and the probability of the data block being stored on a flash-based storage medium increases the more accessed or used the data block has been by an application. In some embodiments, the probability of the data block being stored on a flash-based storage medium may be the following equation: Probability_Flash=Distance_from_MRU_end/Length_of_LRU_list) (e.g., the probability of the data block being stored on a flash-based storage medium is equal to the distance from the position of the data block from the end of the MRU list divided by the total length or number of entries or data blocks of the LRU list).

In some embodiments, throughput (e.g., in IOs/s or MB/s) may be used instead of latencies. For example, in such an embodiment, the effectiveness may be calculated as the following equation: Effectiveness=(Throughput_Cache−Throughput_Later)/Throughput_Now. In some embodiments, each of the throughput values may be estimated in a similar fashion as disclosed with regard to the latencies as previously described.

As such, the technique 700 may receive an identification of a subset of data blocks or a subset of groups of data blocks that are currently stored on a primary storage device. In some embodiments, the technique 700 may determine or calculate an effectiveness (e.g., based on latency) of storing each of the subset of data blocks or subset of groups of data blocks on a cache. In the same or alternative embodiments, the effectiveness may be based on a current primary storage device latency (i.e., access time) of the subset of data blocks or subset of groups of data blocks on the primary storage device, a later primary storage device latency of the subset of data blocks or subset of groups of data blocks on the primary storage device at a subsequent point in time, and/or a cache latency of the subset of data blocks or the subset of groups of data blocks if the subset of data block or the subset of groups of data blocks were stored on the cache. The subset of data blocks or the subset of groups of data blocks may be ranked based on the effectiveness. In some embodiments, the subset of data blocks or subset of groups of data blocks that have effectiveness equal to or greater than an effectiveness threshold value may be copied from the primary storage device to the cache. In some embodiments, the copying may occur when the cache is online and available for storing data blocks.

Figure 8:
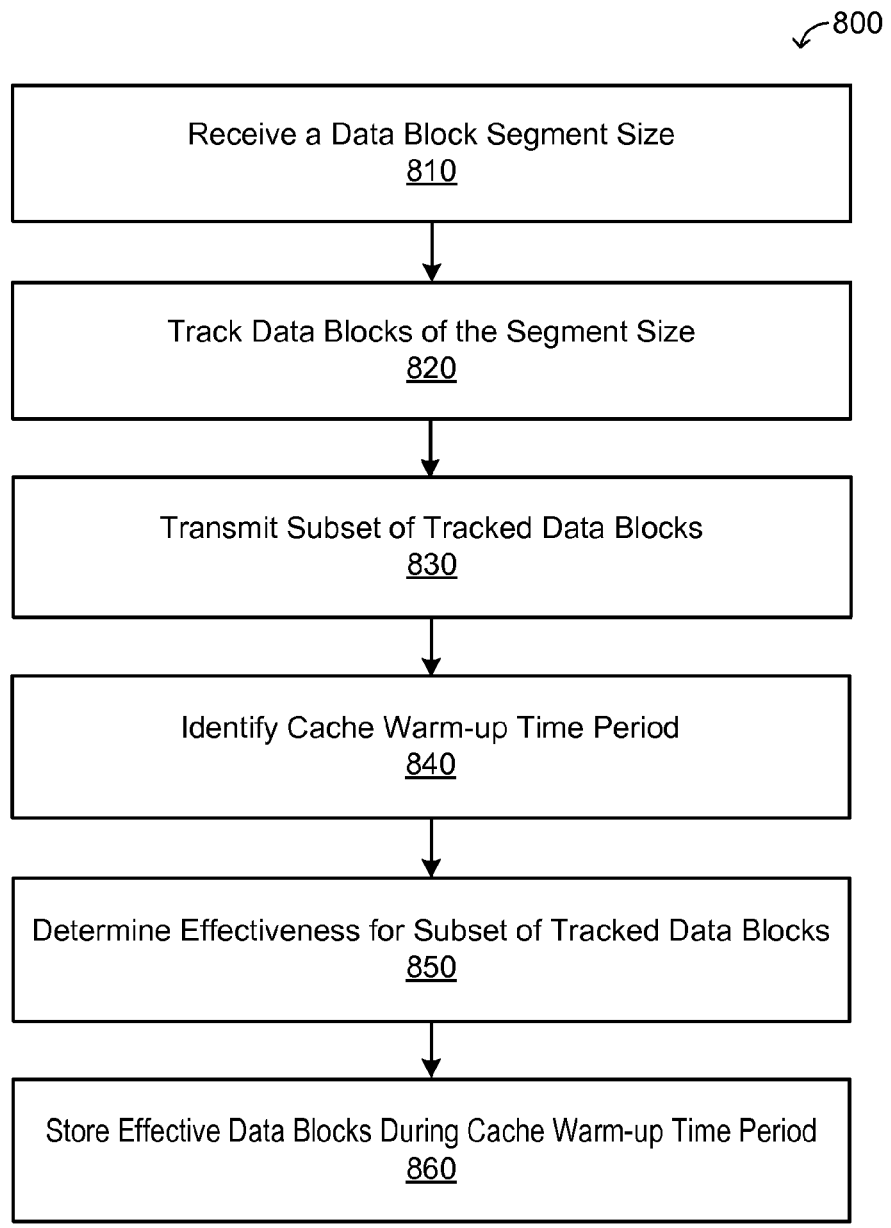
FIG. 8 is a flowchart of a technique to store effective data blocks in a cache memory during a cache warm-up time period in accordance with some embodiments.

FIG. 8 is a flowchart of a technique 800 to store effective data blocks in a cache during a cache warm-up time period in accordance with some embodiments. In general, the technique 800 may be used to store data blocks into a cache during a cache warm-up time period. In some embodiments, a storage system 120 and/or the cache engine 275 may use the technique 800 to copy and store groups of data blocks based on a segment size on a primary storage device (e.g., primary storage device 130) onto a cache memory device (e.g., cache 291). In the same or alternative embodiments, particular steps of the technique 800 may be performed automatically, without human initiation, interaction, or intervention, while other steps of the technique 800 may be performed with human interaction.

As shown in FIG. 8, the technique 800 may receive (at step 810) a data block segment size. For example, the cache engine 275 may receive a numerical value corresponding to a storage space size of data bocks. The technique 800 may further track (at step 820) data blocks based on the received data block segment size. For example, groups of data blocks of a storage space size equal to the segment size may be tracked on a primary storage device (e.g., primary storage device 130) as disclosed with relation to FIG. 6. Furthermore, the technique 800 may transmit (at step 830) a subset of tracked data blocks. For example, the storage system 120 may transmit the subset of tracked data blocks to the cache engine 275. In some embodiments, the technique 800 may identify (at step 840) a cache warm-up time period. For example, the cache engine 275 may receive and/or determine and indicate to the storage system 120 a cache warm-up time period comprising a time window for the cache warm-up. Furthermore, the technique 800 may determine (at step 850) the effectiveness for storing the subset of tracked data blocks on a cache. For example, the cache engine 275 may determine the effectiveness of storing data blocks from a primary storage device (e.g., primary storage device 130) on a cache (e.g., cache 291) based on the method 700 as disclosed with regard to FIG. 7. Finally, the technique 800 may store (at step 860) the effective data blocks during a cache warm-up time period. For example, data blocks may be copied from the primary storage device to the cache during the warm-up time period.

FIG. 9 shows an exemplary cache data structure 290 in which some embodiments operate. In some embodiments, the cache data structure 290 comprises a plurality of dataset entries 960, each dataset entry 960 representing a data block segment, latencies associated with the data block segment, and an effectiveness rank for the data block segment. Each dataset entry 960 may comprise a plurality of data fields for storing data describing or identifying a data block segment, data blocks of the data block segment, a cache latency for each data block segment, a current primary storage device latency for each data block segment, a later primary storage device latency for each data block segment, and an effectiveness rank for each data block segment. As such, in some embodiments, each dataset entry 960 identifies data block segments (e.g., groups of data blocks from a primary storage device 130), the data blocks that are part of the data block segments, and cache and primary storage device latencies for determining an effectiveness for the data block segments.

In some embodiments, a cache data structure entry 960 representing a data block segment may be created in response to the cache engine 275 tracking the data block segment based on data block identification policies (e.g., as previously disclosed with relation to FIG. 6). The data block segment identification 910 may comprise information identifying a tracked data block segment from a primary storage device (e.g., primary storage device 130). For example, the data block segment identification 910 may comprise a numerical value or other identification that is or was previously assigned to a group of data blocks. As such, in some embodiments, the data block segment identification 910 may correspond to any group of data blocks that are being tracked and/or stored on a primary storage device.

The data blocks identification 920 may identify data blocks that are associated with a data block segment. For example, each data block identification 920 may be associated with data block segment identification 910. In some embodiments, the data blocks identification 920 may be associated with a data block segment or group of data blocks stored on a primary storage device (e.g., primary storage device 130) that is being tracked by a cache engine 275. As such, the cache data structure 290 may identify a data block segment and the data blocks that are associated with the data block segment. In some embodiments, the data block identification 920 may be mathematically derived from the data block segment identification 910 to allow the system or methods disclosed herein to explicitly store the data block identification 920.

In some embodiments, the cache data structure 290 may comprise latency times for each data block segment 910. For example, each data block segment 910 may be associated with a cache latency entry 930, current primary storage device latency entry 940, and later primary storage device latency entry 950. In some embodiments, each of the cache latency entry 930, current primary storage device latency entry 940, and the later primary storage device latency entry 950 may specify latency times as disclosed with relation to FIG. 7 (e.g., as discussed with relation to steps 720, 730, and 740). Furthermore, in some embodiments, the cache data structure 290 may comprise an effectiveness rank identification 955. In some embodiments, each data block segment identification 910 may be associated with an effectiveness rank identification 955. In the same or alternative embodiments, the effectiveness rank identification 955 may specify an effectiveness rank between the data block segments from the data block segment identification 910. Furthermore, the effectiveness rank identification 955 may be based on the determined effectiveness as disclosed with regard to FIG. 7 (e.g., at step 750).

In some embodiments, the cache data block segment identification 910, data blocks identification 920, cache latency entry 930, current primary storage device latency entry 940, later primary storage device latency entry 950, and effectiveness rank identification 955 may be generated or received when groups of data blocks and/or a single data block is tracked by a cache engine 275 and/or when data is written to a primary storage device. For example, the cache data structure 290 may be updated whenever groups of data blocks are being tracked for purposes of copying data blocks from a primary storage device to a cache memory.

IV. Systems and Methods for an Efficient Cache Restart

Figure 10:
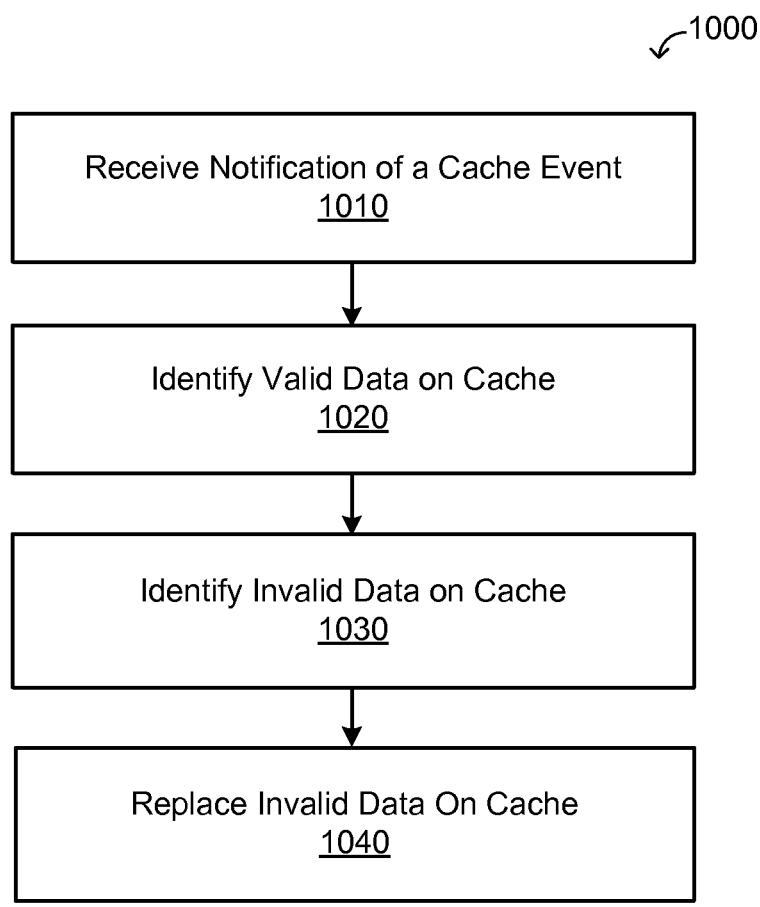
FIG. 10 is a flowchart of a technique to identify valid data and invalid data stored on a cache in accordance with some embodiments.

FIG. 10 is a flowchart of a technique 1000 to identify valid data and invalid data stored on a cache in accordance with some embodiments. In general, the technique 1000 may be used to identify data (e.g., data blocks) stored on a cache (e.g., cache 291) that is a duplicate or copy of corresponding data stored on a primary storage device (e.g., primary storage device 130) as well as data stored on the cache that is no longer a duplicate or copy of corresponding data stored on the primary storage device. In some embodiments, the storage system 120 and/or the cache engine 275 of the storage system 120 may perform the technique 1000. The technique 1000 is described in relation to FIGS. 1-3, which conceptually illustrates the steps of the technique 1000. In some embodiments, the technique 1000 may identify valid data stored on a cache and invalid data stored on the cache and replace the invalid data on the cache with human initiation, interaction, or intervention. In some embodiments, particular steps of the technique 1000 may be performed automatically, without human initiation, interaction, or intervention, while other steps of the technique 1000 may be performed with human interaction. For example, in some embodiments, the steps of the technique 1000 may be initiated in response to a cache event. In some embodiments, a cache event may be a cache failure (e.g., the cache is offline) or a backup restore of the cache.

In some embodiments, some of the steps of technique 1000 are performed or caused to be performed by a cache engine 275 on a storage operating system 300 of a storage system 120. The cache engine 275 may be configured to operate in conjunction with other software modules of the storage system 120, server system 110, and software modules of the storage operating system 300 to collectively perform the embodiments described herein.

As shown in FIG. 10, the technique 1000 may receive (at step 1010) a notification of a cache event. For example, the cache engine 275 may receive a notification that the cache (e.g., cache 291) is or has been offline and/or unavailable and that at least some of the data stored on the cache may no longer be a duplicate or copy of corresponding data stored on a primary storage device (e.g., primary storage device 130). In some embodiments, the data stored on the cache may no longer be a duplicate or copy of corresponding data stored on the primary storage device after subsequent write requests have been made to the primary storage device while the cache is offline. For example, write requests may modify data stored on the primary storage device, but the data stored on the cache may not be updated in response to the write requests modifying data stored on the primary storage device. As such, at least a subset of the data stored on the cache may no longer be a duplicate or a copy of the corresponding data stored on the primary storage device. The technique 1000 may further identify (at step 1020) valid data stored on the cache. For example, the cache engine 275 may identify data stored on the cache (e.g., cache 291) that is a duplicate or copy of corresponding data stored on a primary storage device (e.g., primary storage device 130). Furthermore, the technique 1000 may identify (at step 1030) invalid data stored on the cache. For example, the cache engine 275 may identify data stored on the cache (e.g., cache 291) that is not a duplicate or copy of corresponding data stored on the primary storage device (e.g., primary storage device 130). Further details with regard to identifying valid data stored on the cache and invalid data stored on the cache are discussed with relation to FIGS. 12-18. Finally, the technique 1000 may replace (at step 1040) the invalid data stored on the cache. For example, the cache engine 275 may write new data from a primary storage device (e.g., primary storage device 130) to the portions of the cache (e.g., cache 291) that comprise the invalid data. In some embodiments, the new data that is written to the cache to replace the invalid data stored on the cache may be identified by the systems and methods for an efficient cache restart as previously discussed with regard to FIGS. 6-9.

As such, a notification identifying a cache event may be received. In some embodiments, the notification may indicate that the cache has been offline, unavailable, and/or subject to a cache backup restore. In the same or alternative embodiments, such a cache event may indicate that a subset of data stored on the cache may no longer be a duplicate or a copy of corresponding data stored on a primary storage device. In response to receiving the notification of a cache event, valid data (e.g., data stored on the cache that is a duplicate of corresponding data stored on the primary storage device) and invalid data (e.g., data stored on the cache that is not a duplicate of corresponding data stored on the primary storage device) stored on the cache may be identified. Valid data stored on the cache may remain stored on the cache and invalid data may be replaced by the systems and methods as previously discussed with relation to FIGS. 6-9.

Figure 11:
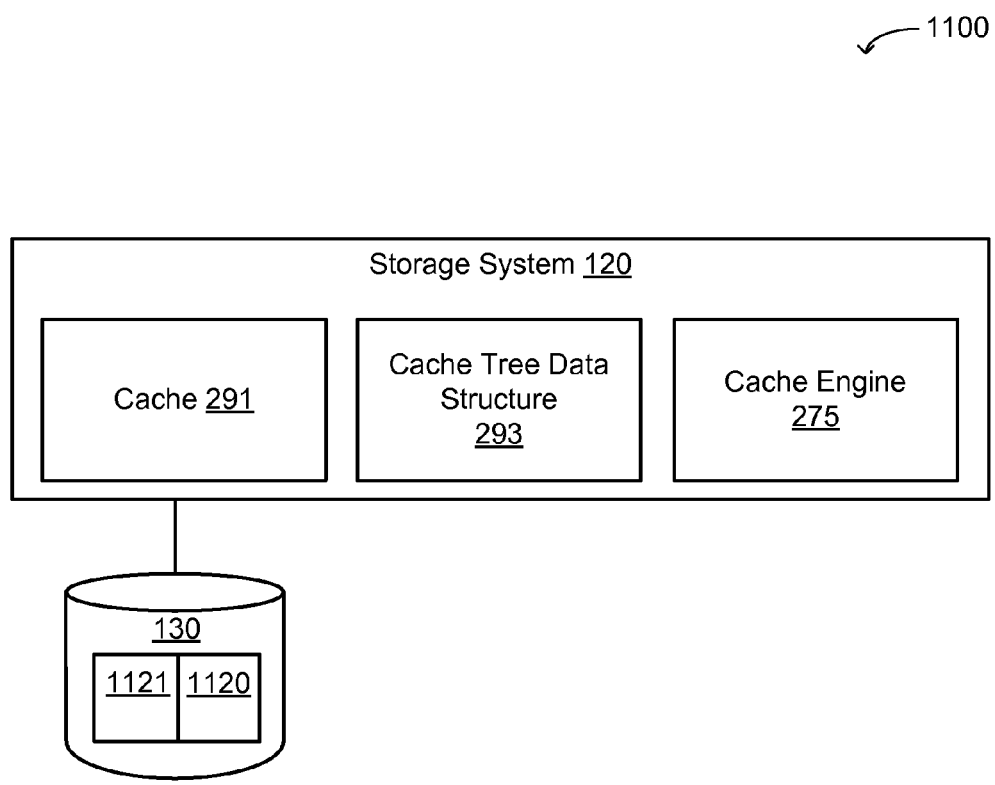
FIG. 11 is a schematic diagram of an example environment for efficient cache restart in which some embodiments operate.

FIG. 11 is a schematic diagram of an example environment 1100 for an efficient cache restart in which some embodiments operate.

A storage system 120 may be coupled to and manage at least one storage device 130. For example, the storage system 120 may receive read requests (e.g., from a server system 110 and/or client 160) for data stored on the primary storage device 130. In response to the request, the storage system 130 may transmit data from the primary storage device 130 to a server system (e.g., server system 110) associated with the read request from a client (e.g., client 160). In some embodiments, the storage system 120 may comprise a cache 291 to store data (e.g., data blocks) from the primary storage device. For example, the cache 291 may store a subset of data stored on the primary storage device 130. As such, the data stored on the cache 291 may be a duplicate or copy of at least a portion of the data stored on the primary storage device 130. In some embodiments, the data stored in the cache 291 may be data that is associated with the systems and methods for an efficient cache restart as previously discussed. As such, the cache 291 may store a copy of data from the primary storage devices 130 that is associated with the identification policies previously discussed and data from the primary storage devices 130 that are not associated with the identification policies previously discussed may not be copied to the cache 291. The storage system 120 may transmit data from the cache 291 in response to a read request for data stored in the primary storage device 130. For example, if the cache 291 of the storage system 120 is storing the data associated with regard to the read request (e.g., a cache hit), then the storage system 120 may transmit the data from the cache 291 instead of transmitting the data from the primary storage device 130. In some embodiments, the cache 291 may be associated with a faster data access time than the primary storage device 130. As such, the transmitting of data from the cache 291 may take less time than the transmitting of the same data from the primary storage device 130. Moreover, since the storage system 120 comprises the cache 291, the transmitting of data from the cache 291 does not have the extra distance associated with the transmitting of the data from the primary storage device 130.

As shown in FIG. 11, the storage system 120 may comprise a cache tree data structure 293. In some embodiments, the cache tree data structure 293 may contain information to identify valid data and invalid data stored on the cache 291.

As shown in FIG. 3, the storage system 120 may further comprise a cache engine 275. In some embodiments, the cache coherency engine 275 may maintain the coherency of data of the cache 291 with regard to the primary storage device 130. For example, the cache engine 275 may ensure that data transmitted from the cache 291 of the storage system 120 in response to a read request for data stored in the primary storage device 130 is a duplicate or copy of the data stored on the primary storage device. In some embodiments, the cache engine 275 may use a cache tree data structure 293 to determine if the data or a portion of the data stored on the cache 291 is a duplicate or copy of the corresponding data stored on the primary storage device 130. In some embodiments, the cache engine 275 may maintain cache coherency by using the cache tree data structure 293.

In some embodiments, the primary storage device 130 may be partitioned. As such, each of the primary storage devices 130 may comprise two or more partitions. In some embodiments, the partitioning of a primary storage device involves the dividing of the primary storage device into multiple logical storage units (e.g., partitions). For example, the primary storage device 130 may comprise a first partition (e.g., a first partition 1120) comprising stored data (e.g., data subject to read requests from a client 160 and/or an area of the primary storage device available for new data from a client 160 and/or server system 110 to be stored) and a second partition (e.g., a second partition 1121). In some embodiments, the second partition may be an unused partition of the primary storage device 130. For example, write requests of data to the primary storage device 130 may only involve the writing of data associated with the write request to the first partition (e.g., first partition 1120) of the primary storage device 130. As such, data associated with the write requests are not written to or stored in the unused second partition of the primary storage device 130. Thus, each primary storage device 130 may comprise a first partition used for storing data for read and/or write requests and a second partition that is not used for storing data associated with the read and/or write requests from clients. In some embodiments, the second partition 1121 may comprise a data tree as discussed in further detail below. For example, the second partition 1121 may comprise a primary storage tree data structure that may be used by the cache engine 275 to maintain cache coherency. For example, in some embodiments, the cache engine 275 may compare the cache tree data structure with the primary storage tree data structure and identify any differences between the two data structures. In some embodiments, the differences in the data structures may correspond to invalid data.

Figure 12:
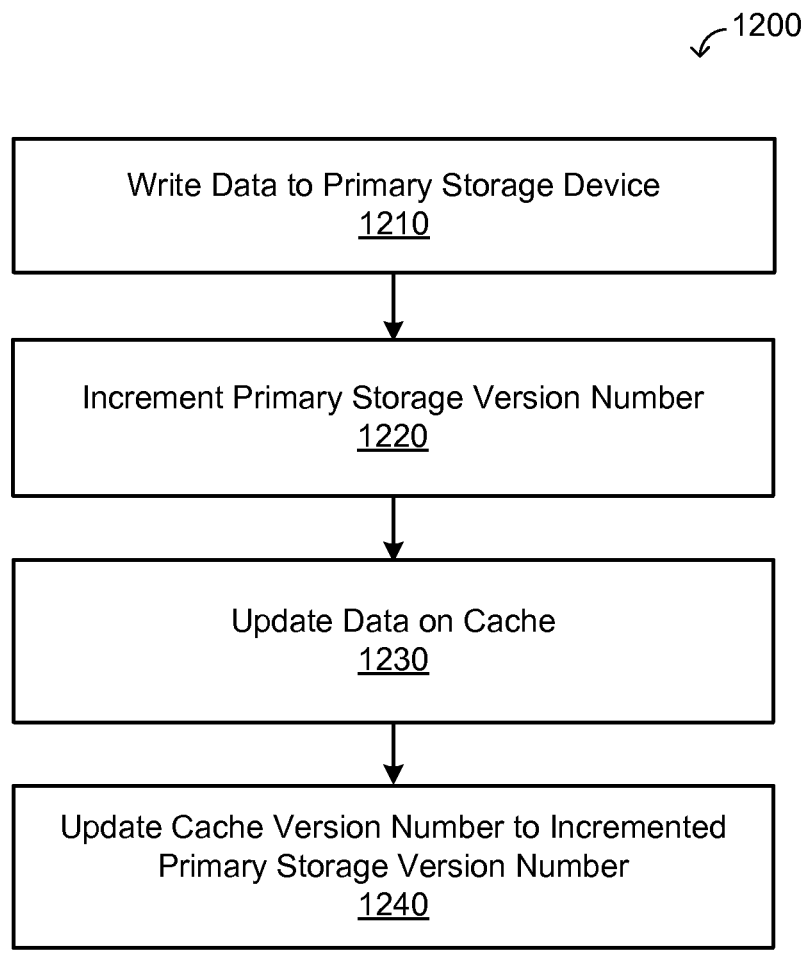
FIG. 12 is a flowchart of a technique to increment a version number associated with a primary storage device and a version number associated with a cache in accordance with some embodiments.

FIG. 12 is a flowchart of a technique 1200 to increment a version number associated with a storage device and a version number associated with a cache in accordance with some embodiments. In general, the technique 1200 may be used to increment a version number associated with a primary storage tree data structure of a primary storage device (e.g., primary storage device 130) and to increment a version number associated with a cache tree data structure of a cache (e.g., cache 291). In some embodiments, a storage system 120 and/or the cache engine 275 may use the technique 1200 to increment the version number associated with a primary storage tree data structure of a primary storage device and to increment a version number associated with a cache tree data structure of a cache memory associated with the primary storage device. In the same or alternative embodiments, particular steps of the technique 1200 may be performed automatically, without human initiation, interaction, or intervention, while other steps of the technique 1200 may be performed with human interaction.

As shown in FIG. 12, the technique 1200 may write (at step 1210) data to a primary storage device. For example, a client (e.g., client 160) may transmit a write request to a primary storage device (e.g., primary storage device 130). In some embodiments, the write request may comprise data to be stored on the primary storage device. In response to the writing of the data to the primary storage device, the technique 1200 may increment (at step 1220) a version number associated with the primary storage device (e.g., a primary storage version number). For example, a cache engine 275 may increment a primary storage version number of a primary storage tree data structure (e.g., primary storage tree data structure associated with the partition 1121) associated with a primary storage device (e.g., primary storage device 130). In some embodiments, the incrementing of the primary storage version number of a primary storage tree data structure may involve the incrementing and/or updating of a version number associated with a node of the primary storage tree data structure. Further details with regard to updating a node of the primary storage tree data structure are described in further detail below with regard to FIGS. 13-18. The technique 1200 may further update (at step 1230) data stored on the cache. For example, the cache engine 275 may copy and store the data written to the primary storage device (e.g., primary storage device 130) at step 1210 to a cache (e.g., cache 291). As such, the cache memory may store a copy or duplicate of the data that has been written to the primary storage device. In some embodiments, the technique 1200 may update (at step 1240) a version number (e.g., a cache version number) of a cache tree data structure associated with a cache (e.g., cache 291). For example, the cache engine 275 may update (e.g., increment) a version number associated with a node of the cache tree data structure. In some embodiments, the updating of the cache version number is performed in response to the updating of the data on the cache memory as disclosed at step 1230.

As such, a cache engine 275 may write data to a primary storage device and may further write (e.g., update) the data on the cache so that the cache may store a duplicate of the data written to the primary storage device. In some embodiments, each of the primary storage device and the cache memory may be associated with a tree data structure. For example, the primary storage device may be associated with a primary storage tree data structure and the cache may be associated with a cache tree data structure. In some embodiments, each of the primary storage tree data structure and the cache memory tree data structure may comprise a plurality of nodes where at least one node may be associated with a version number. In some embodiments, the version number may be incremented in response to the writing or updating of data to the primary storage device and/or the cache.

Figure 13:
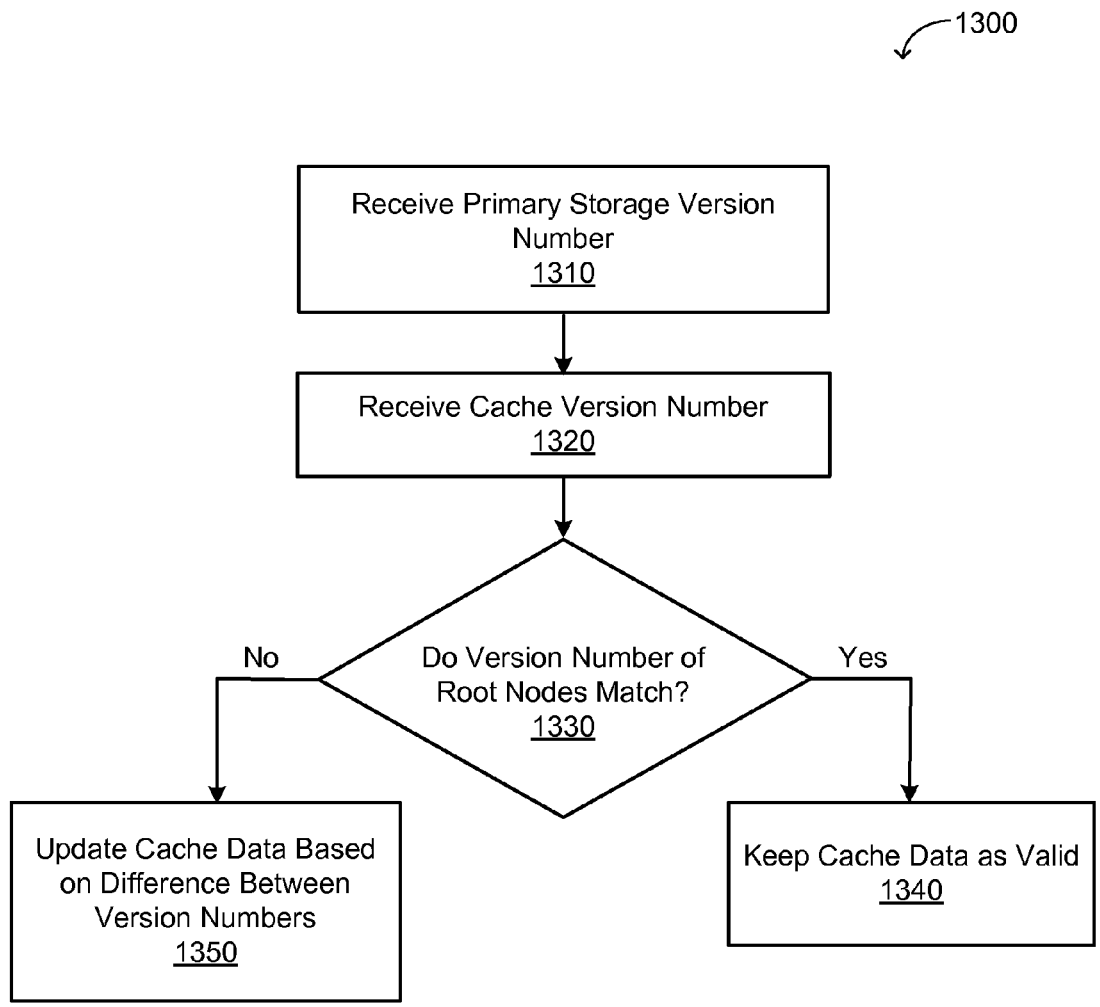
FIG. 13 is a flowchart of a technique to invalidate data on a cache based on a primary storage version number and a cache version number in accordance with some embodiments.

FIG. 13 is a flowchart of a technique 1300 to invalidate data on a cache based on a primary storage version number and a cache version number in accordance with some embodiments. In general, the technique 1300 may be used to identify data stored on a cache that is a duplicate of corresponding data stored on a primary storage device and to identify data stored on the cache that is not a duplicate of corresponding data stored on a primary storage device. In some embodiments, the invalid data may be identified based on a difference of version numbers between nodes of a primary storage tree data structure and a cache tree data structure. In some embodiments, a storage system 120 and/or the cache engine 275 may use the technique 1300 to identify invalid data (e.g., data that is not a duplicate of corresponding data on a primary storage device 130) and valid data (e.g., data that is a duplicate of corresponding data on a primary storage device 130) stored on a cache (e.g., cache 291). In the same or alternative embodiments, particular steps of the technique 1300 may be performed automatically, without human initiation, interaction, or intervention, while other steps of the technique 1300 may be performed with human interaction.

As shown in FIG. 13, the technique 1300 may receive (at step 1310) a primary storage version number. For example, the cache engine 275 may receive a primary storage tree data structure associated with a primary storage device (e.g., primary storage device 130) and identify the primary storage version number from a node of the primary storage tree data structure. In some embodiments, the primary storage version number may be received from the top node (e.g., a root node) of the primary storage tree data structure. Further details with regard to the nodes and a tree data structure are disclosed in further detail below with regard to FIGS. 14-17. Next, the method 1300 may receive (at step 1320) a cache version number. For example, the cache engine 275 may receive a cache tree data structure associated with a cache (e.g., cache 291) and identify the cache version number from a node of the cache tree data structure. In some embodiments, the cache engine 275 may receive the cache version number from the top node (e.g., root node) of the cache tree data structure. Further details with regard to the nodes and a tree data structure are disclosed in further detail below with regard to FIGS. 14-17. Next, the technique 1300 may determine (at step 1330) if the primary storage version number and the cache version number of the root nodes match (e.g., whether the version numbers associated with the root nodes are identical). In some embodiments, the cache engine 275 may make the determination at step 1330. For example, the cache engine 275 may determine if a version number associated with a root node of a primary storage tree data structure and a version number associated with a root node of a cache tree data structure are matching. If the primary storage version number and the cache version number are identical, then the technique 1300 may keep (at step 1340) the data stored on the cache as valid. For example, the cache engine 275 may keep data stored on the cache (e.g., cache 291) as valid and coherent relative to corresponding data stored on a primary storage device (e.g., primary storage device 130). However, if the primary storage version number and the cache version number do not match (e.g., the primary storage version number is larger than the cache version number), then the technique 1300 may update (at step 1350) the data stored on the cache based on a difference between the version numbers of the primary storage tree data structure and the cache tree data structure. In some embodiments, the cache engine 275 may update the data stored on the cache (e.g., cache 291) in response to the difference between version numbers associated with nodes of the primary storage tree data structure and the cache tree data structure. In the same or alternative embodiments, the data may be updated by identifying invalid data and valid data stored on the cache by using the primary storage tree data structure and the cache tree data structure.

As such, a primary storage version number associated with a root node of a primary storage tree data structure of a primary storage device may be compared with a cache version number associated with a top node of a cache tree data structure of a cache memory. In some embodiments, if a version number associated with the top node of the primary storage tree data structure matches the version number associated with the top node of the cache tree data structure (e.g., the version numbers of the top nodes are identical), then the data stored on the cache may be considered valid (e.g., the data is coherent such that the data stored on the cache is a duplicate of corresponding data stored on the primary storage device). However, if the version numbers do not match (e.g., the version number of the top node of the primary storage tree data structure is higher than the version number of the top node of the cache tree data structure), then at least some of the data stored on the cache may be invalid (e.g., at least some of the data is incoherent such that the data stored on the cache may not be a duplicate of corresponding data stored on the primary storage device). In some embodiments, the primary storage tree data structure and the cache tree data structure may be compared to each other in response to the version number of the top node of the primary storage tree data structure being different than the version number of the top node of the cache tree data structure. As such, if the version number of the root nodes for the primary storage tree data structure and the cache tree data structure are different, then the data structures may be analyzed and differences between version numbers of corresponding nodes may be used to identify invalid data.

Figure 14:
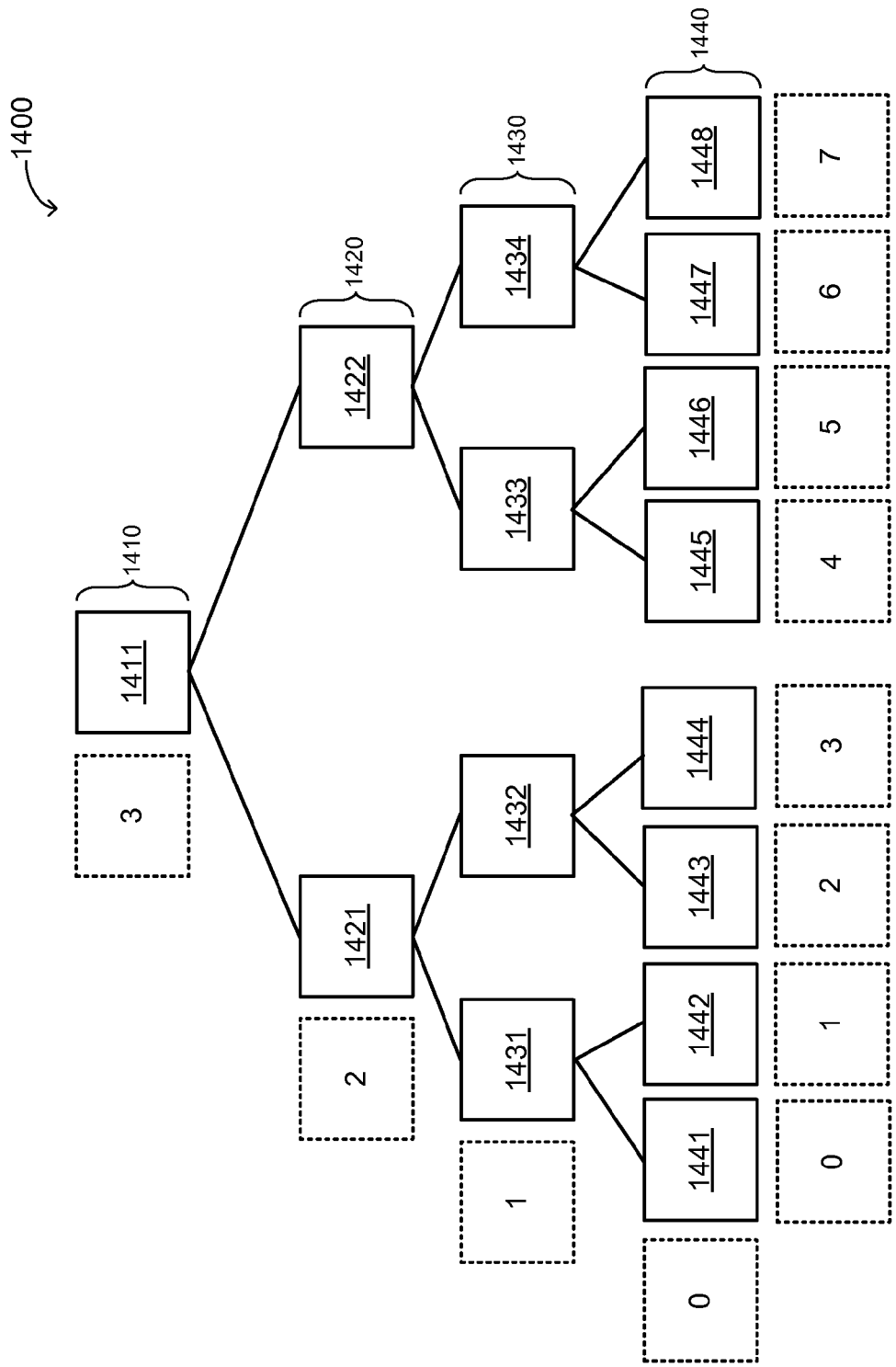
FIG. 14 shows an exemplary cache tree data structure in which some embodiments operate.

FIG. 14 shows an exemplary cache tree data structure 1400 in which some embodiments operate. In general, the cache tree data structure 1400 may be used by a cache engine 275 to identify a status of data stored on a cache (e.g., cache 291).

In some embodiments, write requests to the primary storage device and the cache are tracked by at least one version number. In the same or alternative embodiments, a version number maintained at the cache is referred to as a cache version number and a version number maintained at the primary storage device is referred to as a primary storage version number. As such, the one or more cache version numbers may track updates to the cache and the one or more primary storage version numbers may track updates to the primary storage device. In some embodiments, if the one or more cache version numbers match the one or more primary storage version numbers, then the data stored on the cache may be considered valid (e.g., coherent such that the data stored on the cache memory is a duplicate of corresponding data stored on the primary storage device). However, if the one or more cache version numbers do not match the one or more primary storage version numbers, then at least some of the data stored on the cache be considered invalid (e.g., incoherent such that at least some of the data stored on the cache is not a duplicate of corresponding data stored on the primary storage device).

In some embodiments, the cache tree data structure 1400 may be constructed and maintained to compare the cache version numbers of the cache tree data structure 1400 to primary storage version numbers of a primary storage tree data structure. In some embodiments, the primary storage tree data structure is identical in structure (e.g., same number of nodes and fan-out) to a corresponding cache tree data structure 1400. However, in some embodiments, the version numbers associated with each node of the cache tree data structure and the primary storage tree data structure (e.g., the cache version numbers and primary storage version numbers for one or more nodes) may be different if all of the data stored on the cache is not coherent relative to the corresponding data stored on the primary storage device.

As shown in FIG. 14, the cache tree data structure 1400 may comprise a plurality of nodes. In some embodiments, the nodes of the cache tree data structure 1400 may be organized into a plurality of levels. For example, a level 1410 (e.g., level three) may comprise a node 1411, a level 1420 (e.g., level two) may comprise nodes 1421 and 1422, a level 1430 (e.g., level one) may comprise nodes 1431, 1432, 1433, and 1434, and a level 1440 (e.g., level zero) may comprise nodes 1441, 1442, 1443, 1444, 1445, 1446, 1447, and 1448. In some embodiments, the cache tree data structure 1400 comprises a tree structure of a plurality of branches. For example, a node may be associated with a fan-out to a plurality of other nodes. For example, the cache tree data structure 1400 shows nodes having a fan-out of two, but any number of fan-out for a node may be used. As such, the node 1411 may be associated with a fan-out of two leading towards nodes 1421 and 1422. In some embodiments, the nodes at the bottom of the cache tree data structure 1400 (e.g., nodes 1441, 1442, 1443, 1444, 1445, 1446, 1447, and 1448 at level zero) may each represent an actual data block stored on the cache (or in the case of a primary storage tree data structure, a data block stored on the primary storage device). In the same or alternative embodiments, the number of nodes at the bottom of the cache tree data structure may represent each data block stored on the cache. In some embodiments, nodes at level one, level two, and level three may represent a plurality of data blocks. For example, the leftmost node of level one (e.g., node 1431) may represent changes to data block 1441 (e.g., data block zero) and data block 1442 (e.g., data block one). Similarly, the node 1421 at level two may represent changes to data blocks 1441, 1442, 1443, and 1444. In some embodiments, an advantage to such a tree structure where nodes at levels one, two, and three represent changes to a plurality of data blocks is that if an entire sub-tree of the cache tree data structure 1400 needs to be transferred, then the exact data blocks that need to be transferred may be quickly identified.

In some embodiments, each node of the cache tree data structure 1400 may track an update to a portion of the tree represented by the cache tree data structure 1400. In some embodiments, an update may correspond to a write request to the data represented by the node of the cache tree data structure. In the same or alternative embodiments, the version number associated with each node may be associated with a time when the node was last updated. For example, the cache may be subject to a plurality of write requests and the version number for a node may be updated in response to the write request. Furthermore, in some embodiments, the version number of a node may indicate whether another node beneath the node has been subjected to the write request. Further details with regard to the updating of the version number of nodes of the cache tree data structure are discussed in further detail with regard to FIGS. 15-17.

As such, a cache tree data structure and a primary storage tree data structure may comprise a plurality of nodes organized into a tree. In some embodiments, each tree may comprise a root node that may comprise a version number associated with the most recent update (e.g., write request) to the data represented by the tree. Furthermore, each tree may comprise a plurality of bottom nodes where each bottom node represents a data block stored on either the primary storage device or the cache memory. The intermediate nodes (e.g., nodes between the root node and the bottom nodes) represent groups of data blocks stored on either the primary storage device or the cache memory. In some embodiments, each node (e.g., root node, intermediate nodes, and root nodes) is associated with a version number.

Figure 15:
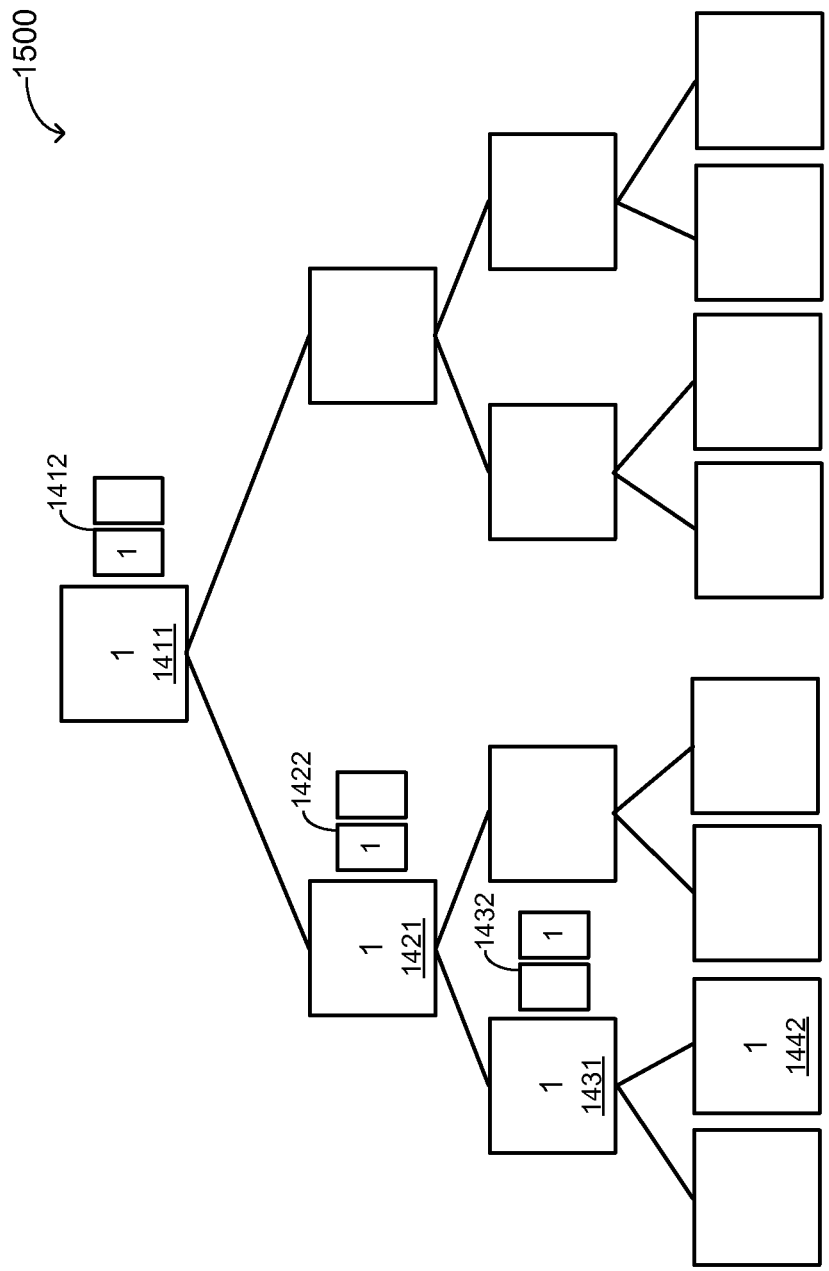
FIG. 15 shows an exemplary updated cache tree data structure that has been updated in response to a first write request in which some embodiments operate.

FIG. 15 shows an exemplary updated cache tree data structure 1500 that has been updated in response to a first write request in which some embodiments operate. In general, the updated cache tree data structure 1500 may represent an updated version of the cache tree data structure 1400 that has been updated in response to a first write request to data stored on a cache (e.g., cache 291) associated with the cache tree data structure.

As shown in FIG. 15, the updated cache tree data structure 1500 may comprise the same number of nodes and same tree structure as the cache tree data structure 1400. However, the updated cache tree data structure 1500 may reflect changes to data blocks stored on the cache. For example a version number associated with one or more nodes may be updated to reflect a write request modifying data stored on the cache. For example, a first write request to the cache may be received. In response to the first write request, a data block stored on the cache (e.g., cache 291) may be modified. As such, in response to the modifying of the data block stored on the cache, the bottom node 1442 may be modified to indicate that the data block represented by the bottom node 1442 has been modified in response to the write request. In some embodiments, the version number of the bottom node 1442 may be modified to indicate a '1' corresponding to a first write transaction of the cache that has modified the data block associated with the bottom node 1442. Furthermore, the version numbers associated with intermediate nodes 1431 and 1421 and root node 1412 may be modified in response to the write request associated with the data block represented by the bottom node 1442. As such, a version number of each node connected above the bottom node 1442 may be updated to reflect the new version number. For example, each intermediate node in a path from the bottom node 1442 to the root node 1411 may have its associated version number updated. In some embodiments, each of the root node and intermediate nodes may be associated with an update bitmap data structure. In some embodiments, the update bitmap data structure may indicate a part of the tree or sub-tree that has been updated. For example, the update bitmap data structure 1432 associated with the node 1431 may indicate the nodes immediately below (e.g., a level below) the node 1431 that have been updated. For example, the update bitmap data structure 1532 may comprise a plurality of entries. Each entry may correspond to a single node immediately below the node 1431 and may indicate whether the node has been updated in response to a write request. Similarly, the update bitmap data structure 1422 and the update bitmap data structure 1412 may comprise an entry for each node below their respective nodes.

As such, in response to the first write request, the version number of the bottom node 1442 may be updated. For example, the version number of the bottom node 1442 may be updated based on when (e.g., if it is the first write request, second write request, etc.) the write request has updated a data block associated with the bottom node 1442. Furthermore, the version number of nodes in a path to the root node 1411 may also be updated based on when the write request has updated the data block associated with the bottom node 1442. For example, intermediate nodes 1432 and 1422 above the bottom node 1442 may be updated as part of the path to the root node 1411.

Figure 16:
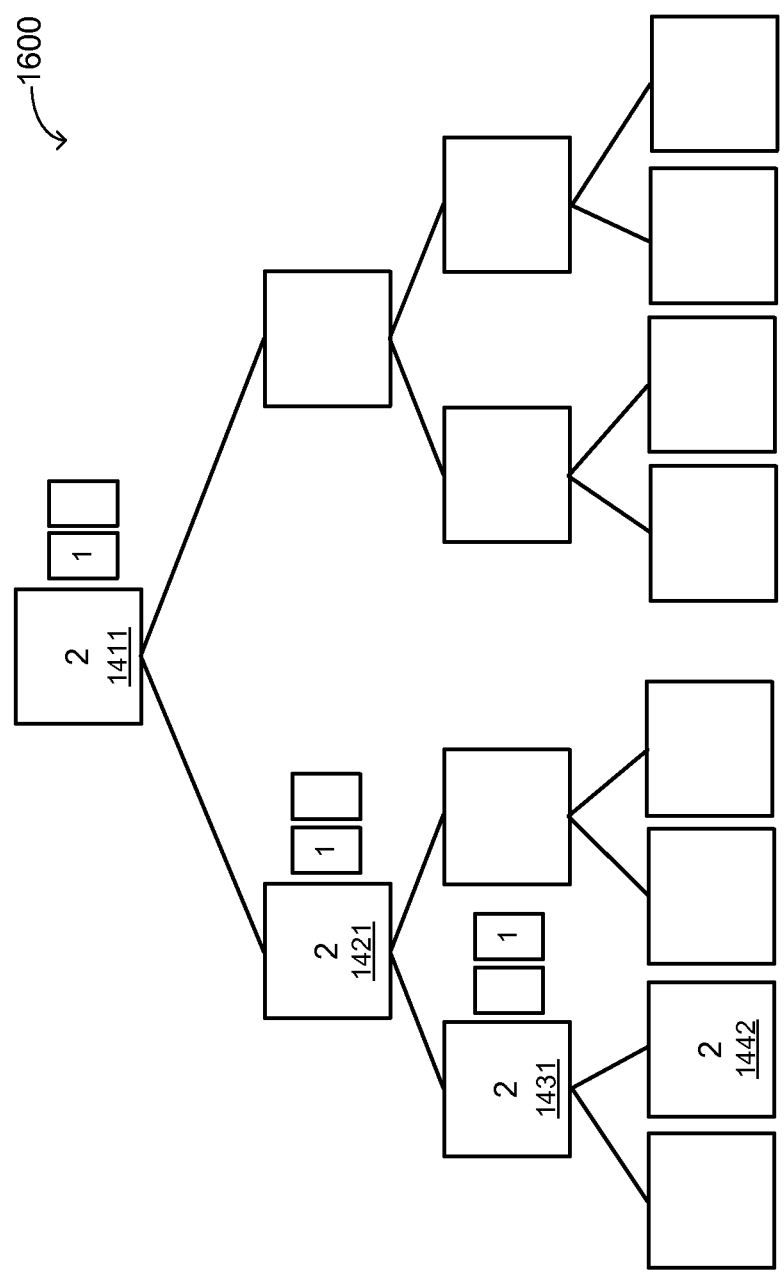
FIG. 16 shows an exemplary updated cache tree data structure that has been updated in response to a second write request in which some embodiments operate.

FIG. 16 shows an exemplary updated cache tree data structure 1600 that has been updated in response to a second write request in which some embodiments operate. In general, the updated cache tree data structure 1600 may represent an updated version of the cache tree data structure 1500 that has been updated in response to a second write request to data stored on a cache (e.g., cache 291) associated with the cache tree data structure.

As shown in FIG. 16, the bottom node 1442 may be updated to reflect the second write request. For example, the second write request may modify the data block associated with the bottom node 1442. As such, the version number associated with the bottom node 1442 may be updated to indicate that the data block associated with the bottom node 1442 has been modified by the second write request to the cache. As such, the version number associated with the bottom node 1442 may be incremented or changed from a '1' to a '2.' Furthermore, as previously discussed, the version number associated with the root node 1411 may also be incremented or changed to a value of '2' and any intermediate nodes (e.g., nodes 1421 and 1431) between the root node 1411 and the bottom node 1442 may also have an associated version number incremented or changed to a value of '2.' For example, version numbers associated with a root node 1411 and intermediate nodes 1421 and 1431 may be incremented or changed to a value of '2.' As such, version numbers associated with nodes may be incremented or changed to reflect that a data block associated with a bottom node or a data block associated with part of a tree has been updated.

As such, version numbers of nodes of the cache tree data structure may be updated based on the write request to the cache. For example, version numbers may be updated to indicate the last write request that has modified a data block associated with a bottom node.

Figure 17:
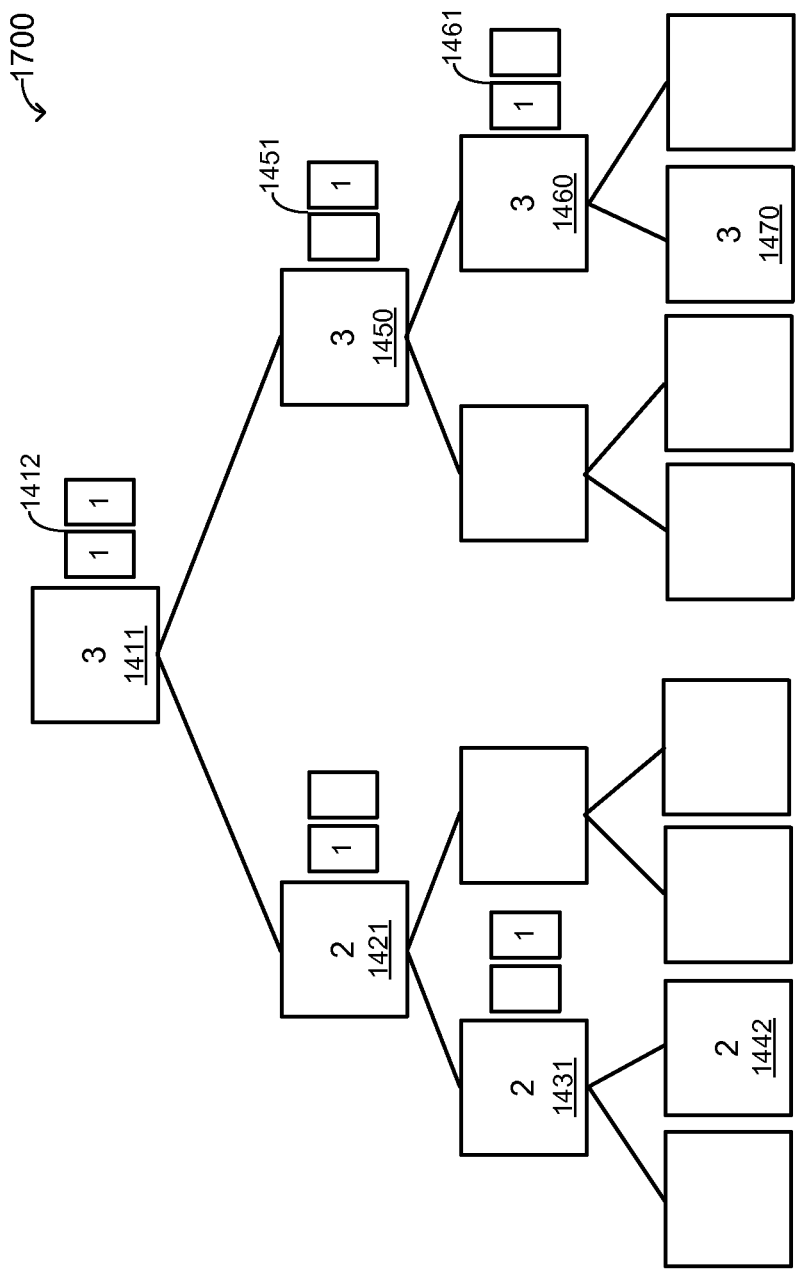
FIG. 17 shows an exemplary updated cache tree data structure that has been updated in response to a third write request in which some embodiments operate.

FIG. 17 shows an exemplary updated cache tree data structure 1700 that has been updated in response to a third write request in which some embodiments operate. In general, the updated cache tree data structure 1700 may represent an updated version of the cache tree data structure 1600 that has been updated in response to a third write request to data stored on a cache (e.g., cache 291) associated with the cache tree data structure.

As shown in FIG. 17, the bottom node 1470 has been updated to reflect that the data block associated with the bottom node 1470 has been modified by the third write request. As such, the version number associated with the bottom node 1470 has been updated to a value of '3' to indicate that the last write request associated with the data block was the third write request received by the cache. Furthermore, as previously discussed, the version number associated with the root node may also be updated with the value associated with the last write request (e.g., a value of '3') and intermediate nodes 1460 and 1450 in the path between the bottom node 1470 and root node 1411 may have their respective version numbers also updated to the value of '3.' Furthermore, the update bitmaps 1412, 1451, and 1461 have been updated to show which nodes underneath the respective nodes have been updated by a write request to the cache.

Figure 18:
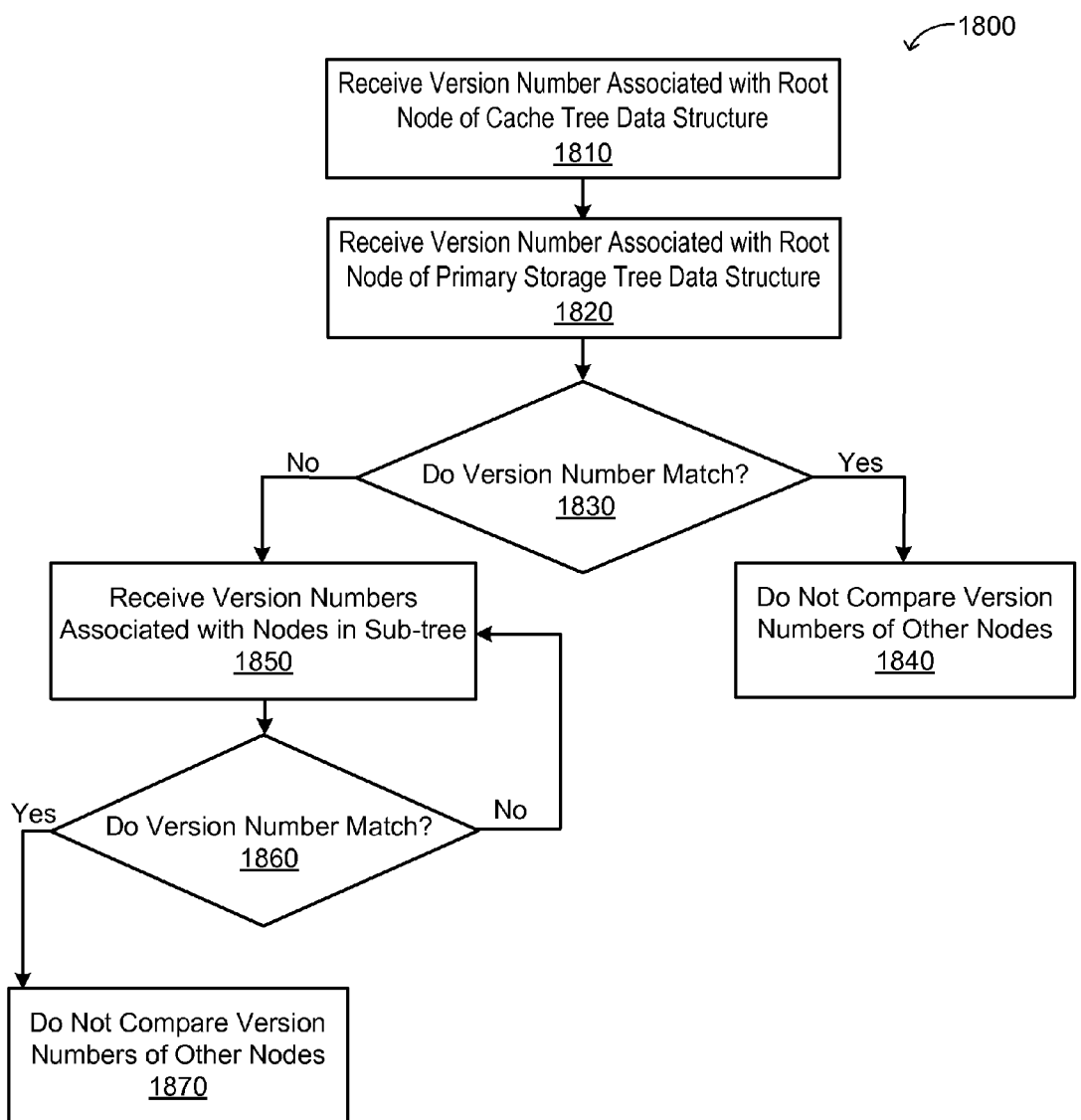
FIG. 18 is a flowchart of a technique to use a cache tree data structure and a primary storage tree data structure to identify invalidated data stored on a cache in accordance with some embodiments.

FIG. 18 is a flowchart of a technique 1800 to use a cache tree data structure and a primary storage tree data structure to identify invalidated data stored on a cache in accordance with some embodiments. In general, a cache engine 275 may use the technique 1800 to compare a primary storage tree data structure and a cache tree data structure (e.g., cache tree data structure 1400, 1500, 1600, and/or 1700).

As shown in FIG. 18, the technique 1800 may receive (at step 1810) a version number associated with a root node of a cache tree data structure. Furthermore, the technique 1800 may receive (at step 1820) a version number associated with a root node of a primary storage tree data structure. As such, the technique 1800 may receive a version number associated with a root node of a tree data structure for each of the cache and the primary storage device. In some embodiments, the tree data structure for each of the cache and the primary storage device comprises information (e.g., version numbers of nodes) to indicate a status of one or more data blocks stored on either the cache or the primary storage device. In some embodiments, the technique 1800 may make a determination (at step 1830) as to whether the version number associated with the root node of the cache tree data structure is the same as the version number associated with the root node of the primary storage tree data structure. For example, the cache engine 275 may compare the version numbers with each other and if the version numbers are the same, then the technique may not compare (at step 1840) version numbers of other nodes of the cache tree data structure with corresponding nodes of the primary storage tree data structure. However, if the version number associated with the cache tree data structure is not the same as the version number associated with the root node of the primary storage tree data structure, then the technique 1800 may receive (at step 1850) version numbers associated with nodes in a sub-tree of the cache tree data structure and the primary storage tree data structure. For example, version numbers associated with nodes below the previously compared node may be received and the technique 1800 may then compare (at step 1860) the version numbers of the nodes in the sub-tree for both the cache tree data structure and the primary storage tree data structure. If the version numbers do not match and are not identical, then the technique 1800 may repeat from the step 1850. However, if the version numbers do match, then no further nodes below the node checked at step 1850 and in the sub-tree may be checked and the method may stop. In some embodiments, the technique 1800 may stop at a particular node. For example, the technique 1800 may not continue until reaching a bottom node of the cache tree data structure. Instead, the method 1800 may stop at a node at any level (e.g., level one, two, or three as previously discussed) and data blocks under the node may then be identified for copying to the cache memory device.

As such, the technique 1800 may traverse through a cache tree data structure and a corresponding primary storage tree data structure. In some embodiments, a first check or comparison may involve the checking of the version number of the root node for both the primary storage tree data structure and the cache tree data structure. If the version numbers of the root nodes are the same, then no further version numbers may be compared and the data stored on the cache may be considered to be a duplicate of the corresponding data stored on the primary storage device. However, if the version numbers of the root nodes are not the same, then nodes below the root node (e.g., intermediate nodes) may have their associated version numbers compared and the comparison of nodes may continue until a node with similar version numbers is found and/or the bottom nodes in a sub-tree have all been compared. In some embodiments, a status of the data blocks stored on the cache memory may be updated based on the comparison of the cache tree data structure and the primary storage tree data structure (e.g., the status of the data blocks may be updated based on a difference of version numbers between corresponding nodes of the tree data structures). For example, a status of data blocks stored on the cache memory associated with a node having a version number that is different than the version number of a node associated with a corresponding data block stored on the primary storage device may be marked or updated as invalid or incoherent. Furthermore, a status of data blocks that have identical or the same version numbers for corresponding nodes may be marked or updated as valid or coherent.

In some embodiments, the update bitmap data structure may comprise information to indicate an amount or number of changes made to the cache (e.g., cache 291) contents. For example, the update bitmap data structure may comprise information to indicate recent changes to the data stored on the cache (e.g., a change to a data block or a portion of the tree structure results in a '1' in the update bitmap data structure). In some embodiments, the update bitmap data structure may be periodically reset (e.g., the entries are all set to '0'). For example, the update bitmap data structure may be reset and all entry values set to '0' after a predetermined amount of time or after a number of IO requests (e.g., write requests and/or read requests) have been received by the cache. In some embodiments, if the cache is subject to a short disconnect (e.g., briefly offline), then a number of updates made to the primary storage device while the cache is disconnected may be kept at a storage server in an update log (e.g., in the NVRAM 245). In some embodiments, the update log may also comprise a version number and the version numbers of the update log and the update bitmap data structure for the cache may be compared and any differences may be applied to the cache. In some embodiments, if there was a long cache disconnect, then a large read and/or write request may be transmitted to copy a plurality of data blocks from the primary storage device to the cache. For example, if the version number of the root node of the cache tree data structure is beyond a threshold value when compared with the version number of the root node of the primary storage device (e.g., the threshold value is four and the version number for the root node of the cache is 0 and the version number for the root node of the primary storage device is 4), then a large read and/or write request may be transmitted instead of retrieving data blocks individually.

In some embodiments, the techniques using the tree data structures may be performed in response to a cache restart. For example, a cache tree data structure may be constructed to reflect the data stored on the cache in response to the restarting of a cache. In some embodiments, the cache tree data structure may be continuously generated and/or updated and a restart of the cache may result in the comparing of the cache tree data structure with the primary storage tree data structure.

Various Embodiments

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a non-transitory computer readable medium. The computer readable medium may comprise a storage medium having instructions stored thereon in which may be used to control, or cause, a computer to perform any of the processes of an embodiment. The storage medium may include, without limitation, any type of device including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, circuits, modules, algorithms, techniques, processes, or method steps of embodiments described herein may be implemented as computer electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The algorithm, techniques, processes, or methods described in connection with embodiments disclosed herein may be embodied directly in hardware, in software executed by a processor, or in a combination of the two. In some embodiments, any software application, program, tool, module, or layer described herein may comprise an engine comprising hardware and/or software configured to perform embodiments described herein. In general, functions of a software application, program, tool, module, or layer described herein may be embodied directly in hardware, or embodied as software executed by a processor, or embodied as a combination of the two. A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

What is claimed is:

1. A system, comprising:
    at least one processor; and
    a memory operatively coupled to the at least one processor and a cache memory, the memory storing
    a cache engine executable by the at least one processor and when executed by the at least one processor, the cache engine operable to:
    identify a data block stored on a primary storage device of the system based on one or more data block identification policies;
    determine latencies associated with the identified data block, the latencies including a cache memory latency specifying a first estimated amount of time to access the identified data block if the identified data block is stored in the cache memory, a primary storage device latency specifying a second estimated amount of time to access the identified data block from the primary storage device, and a future primary storage device latency specifying a third estimated amount of time to access the identified data block from the primary storage device at a future point in time;
    calculate an effective latency for the identified data block based on the cache memory latency, the primary storage device latency, and the future primary storage device latency; and
    store, on the cache memory, the identified data block when the effective latency for the identified data block is above a threshold effective latency value.

2. The system of claim 1, wherein the future primary storage device latency is based on a projected network bandwidth and an expected storage medium for the primary storage device.

3. The system of claim 1, wherein the effective latency is calculated by subtracting the cache memory latency from the future primary storage device latency and dividing a result of the subtraction by the primary storage device latency.

4. The system of claim 1, wherein the one or more data block identification policies identify the identified data blocks stored on the primary storage device based on when the identified data blocks stored on the primary storage device is accessed within a time period and how often the identified data blocks stored on the primary storage device is accessed within the time period.

5. The system of claim 1, wherein the identified data block is stored on the cache memory during a cache warm-up time window.

6. A method comprising:
    using computer hardware for performing:
    identifying, by a processor of a storage system, a data block stored on a primary storage of the storage system device based on one or more data block identification policies;
    determining latencies associated with the data block, the latencies including a cache memory latency specifying a first estimated amount of time to access the identified data block if the identified data block is stored in the cache memory, a primary storage device latency specifying a second estimated amount of time to access the identified data block from the primary storage device, and a future primary storage device latency specifying a third estimated amount of time to access the identified data block from the primary storage device at a future point in time;
    calculating an effective latency for the identified data block based on the cache memory latency, the primary storage device latency, and the future primary storage device latency; and
    storing, on the cache memory, the identified data block when the effective latency for the identified data block is above a threshold effective latency value.

7. The method of claim 6, wherein the future primary storage device latency is based on a projected network bandwidth and an expected storage medium for the primary storage device.

8. The method of claim 6, wherein the effective latency is calculated by subtracting the cache memory latency from the future primary storage device latency and dividing a result of the subtraction by the primary storage device latency.

9. The method of claim 6, wherein the one or more data block identification policies identify the identified data block stored on the primary storage device based on when the identified data block stored on the primary storage device is accessed within a time period and how often the identified data block stored on the primary storage device is accessed within the time period.

10. The method of claim 6, wherein the identified data block is stored on the cache memory during a cache warm-up time window.

11. A non-transitory computer readable storage medium containing one or more program instructions configured for execution by a processor and further configured to be stored on the non-transitory computer readable storage medium, the program instructions when executed operable to:
    receive a data block segment size;
    identify a data block segment stored on the primary storage device of a storage system based on an identification policy, each data block segment including a number of data blocks corresponding to the data block segment size;

determine latencies associated with the identified the data block segment, the latencies including a cache memory latency that is a first estimated amount of time to access the identified data block segment if the identified data block segment is stored on a cache memory associated with a storage system, a primary storage device latency that is a second estimated amount of time to access the identified data block segment from the primary storage device, and a future primary storage device latency that is a third estimated amount of time to access the identified data block segment from the primary storage device at a future point in time;

calculate an effective latency associated with the identified data block segment by subtracting the cache memory latency from the future primary storage device latency and dividing a result of the subtraction by the primary storage device latency; and copy, to the cache memory, the data block segment based on the effective latency.

12. The non-transitory computer readable medium of claim 11, wherein the future primary storage device latency is based on a projected network bandwidth and an expected storage medium for the primary storage device.

13. The non-transitory computer readable medium of claim 11, wherein the identification policy identifies the identified data block segment stored on the primary storage device based on when the data blocks of the data block segment stored on the primary storage device are accessed within a time period and how often the data blocks of the data block segment stored on the primary storage device are accessed within the time period.

14. The non-transitory computer readable medium of claim 11, wherein the data block segment is copied to the cache memory during a cache warm-up time window.

* * * * *